US011381810B2

(12) United States Patent
Kazui et al.

(10) Patent No.: US 11,381,810 B2
(45) Date of Patent: Jul. 5, 2022

(54) ENCODING APPARATUS, ENCODING METHOD, AND DECODING APPARATUS

(71) Applicant: FUJITSU LIMITED, Kawasaki (JP)

(72) Inventors: Kimihiko Kazui, Kawasaki (JP); Akihiro Yamori, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/174,374

(22) Filed: Feb. 12, 2021

(65) Prior Publication Data

US 2021/0168358 A1 Jun. 3, 2021

Related U.S. Application Data

(63) Continuation of application No. PCT/JP2018/034886, filed on Sep. 20, 2018.

(51) Int. Cl.
*H04N 19/105* (2014.01)
*H04N 19/159* (2014.01)
*H04N 19/176* (2014.01)
*H04N 19/46* (2014.01)

(52) U.S. Cl.
CPC ......... *H04N 19/105* (2014.11); *H04N 19/159* (2014.11); *H04N 19/176* (2014.11); *H04N 19/46* (2014.11)

(58) Field of Classification Search
None
See application file for complete search history.

(56) References Cited

U.S. PATENT DOCUMENTS

| | | | |
|---|---|---|---|
| 2010/0295713 A1* | 11/2010 | Ueno | H04N 1/32101 341/87 |
| 2013/0315304 A1* | 11/2013 | Fu | H04N 19/463 375/240.12 |
| 2017/0127071 A1* | 5/2017 | Sinha | H04N 19/139 |
| 2017/0142448 A1* | 5/2017 | Karczewicz | H04N 19/91 |

(Continued)

FOREIGN PATENT DOCUMENTS

WO 2018/070107 A1 4/2018

OTHER PUBLICATIONS

Rickard Sjoberg et al., "Description of SDR and HDR Video Coding Technology Proposal by Ericsson and Nokia", Joint Video Exploration Team (JVET) of ITU-T SG 16 WP 3 and ISO/IEC JTC 1/SC 29/WG 11, 10th Meeting: San Diego, CA, USA, JVET-J0012-v1, Apr. 10-20, 2018 (Total 32 pages).

(Continued)

*Primary Examiner* — Talha M Nawaz
(74) *Attorney, Agent, or Firm* — Fujitsu Patent Center

(57) ABSTRACT

An encoding apparatus includes: a memory; and a processor coupled to the memory and configured to: generate a value corresponding to a reference direction selected in intra prediction for a process target block by converting a value indicating the reference direction in accordance with a shape of the process target block; calculate a predicted value in the process target block from the values corresponding to the reference directions generated in intra prediction for neighboring blocks adjacent to the process target block; and generate a binary signal for arithmetic encoding based on the predicted value and the value corresponding to the reference direction generated in the intra prediction for the process target block.

10 Claims, 19 Drawing Sheets

(56) References Cited

U.S. PATENT DOCUMENTS

| | | | |
|---|---|---|---|
| 2018/0098064 A1 | 4/2018 | Seregin et al. | |
| 2018/0213222 A1* | 7/2018 | Lee | H04N 19/129 |
| 2019/0246108 A1 | 8/2019 | Aono et al. | |
| 2020/0404257 A1* | 12/2020 | Filippov | H04N 19/48 |
| 2020/0404308 A1* | 12/2020 | Filippov | H04N 19/107 |
| 2020/0404311 A1* | 12/2020 | Filippov | H04N 19/91 |

OTHER PUBLICATIONS

Benjamin Brass et al., "Versatile Video Coding (Draft 2)", Joint Video Experts Team (JVET) of ITU-T SG 16 WP 3 and ISO/IEC JTC 1/SC 29/WG 11, 11th Meeting: Ljubljana, SI, JVET-K1001-v4, Aug. 17, 2018 (Total 85 pages) (Cited in ISR).

Jianle Chen et al., "Algorithm Description for Versatile Video Coding and Test Model 2 (VTM 2)", Joint Video Experts Team (JVET) of ITU-T SG 16 WP 3 and ISO/IEC JTC 1/SC 29/WG 11, 11th Meeting: Ljubljana, SI, JVET-K1002-vl, pp. 1-14, Aug. 10, 2018 (Total 8 pages) (Cited in ISR).

Chuohao Yeo et al., "Non-CE6: On Intra Prediction Mode Coding", Joint Collaborative Team on Video Coding (JCT-VC) of ITU-T SG16 WP3 and ISO/IEC JTC1/SC29/WG11, 7th Meeting: Geneva, CH, JCTVC-G153, pp. 1-13 Nov. 21-30, 2011 (Total 13 pages) (Cited in ISR).

Vadim Seregin et al., "Block Shape Dependent Intra Mode Coding", Joint Video Exploration Team (JVET) of ITU-T SG 16 WP 3 and ISO/IEC JTC 1/SC 29/WG 11, 4th Meeting: Chengdu, CN, JVET-D0114rl, pp. 1-4, Oct. 15, 2016 (Total 4 pages) (Cited in ISR).

International Search Report and Written Opinion of the International Searching Authority (Form PCT/ISA/210 and 237), mailed in connection with PCT/JP2018/034886 and dated Nov. 6, 2018 (Total 11 pages).

Japanese Office Action dated Dec. 7, 2021 for corresponding Japanese Patent Application No. 2020-547555, with English Translation, 11 pages. Please note NPL "Benjamin Bross, et al.,Versatile Video Coding (Draft 2),Joint Video Experts Team (NET) of ITU . . . " cited herewith was previously cited in an IDS filed on Feb. 21, 2021.

* cited by examiner

FIG. 4
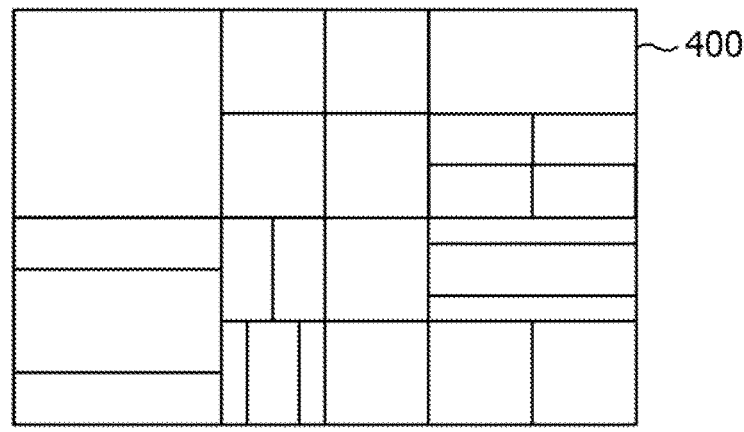
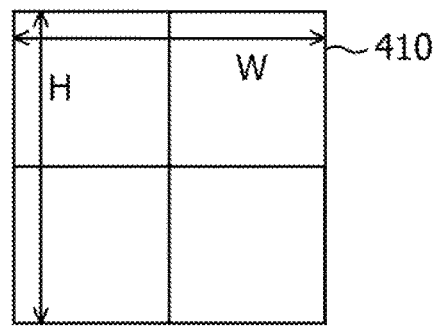
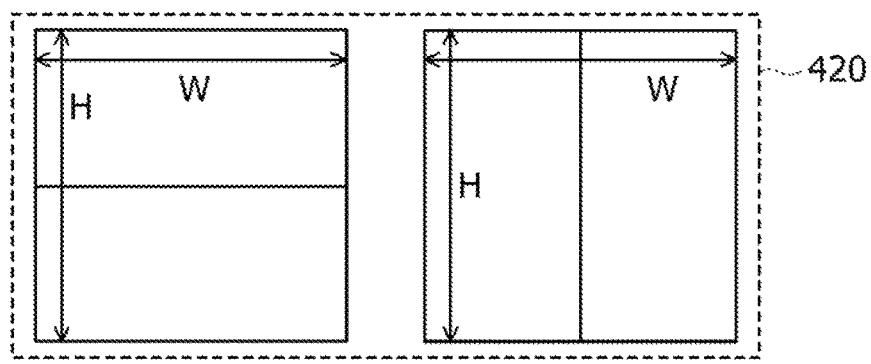
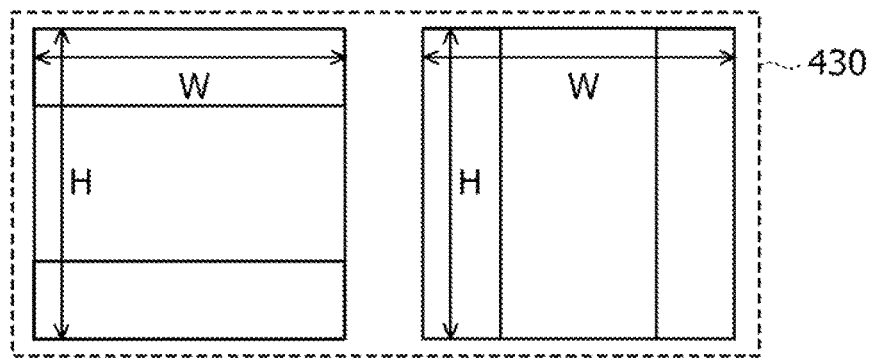

FIG. 7
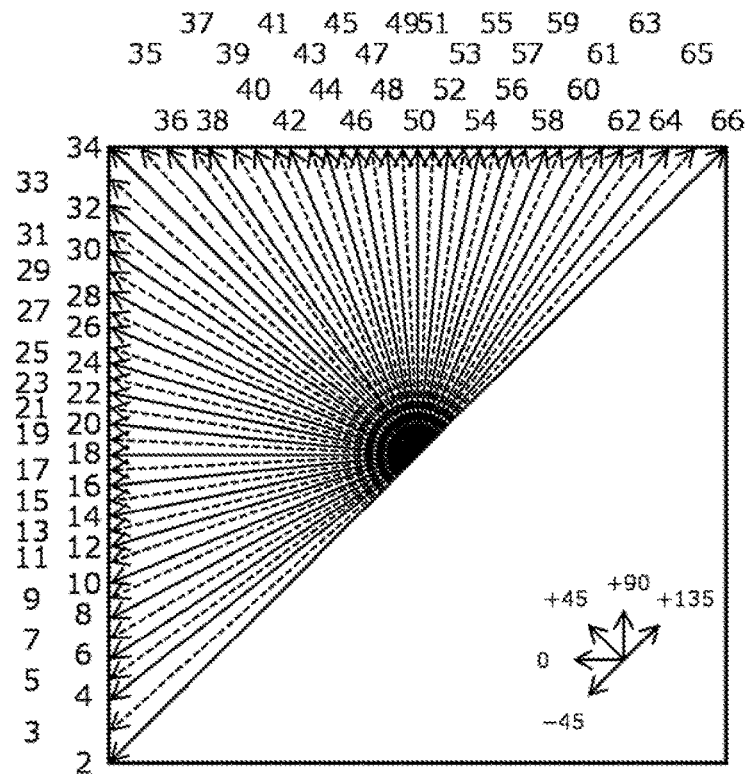
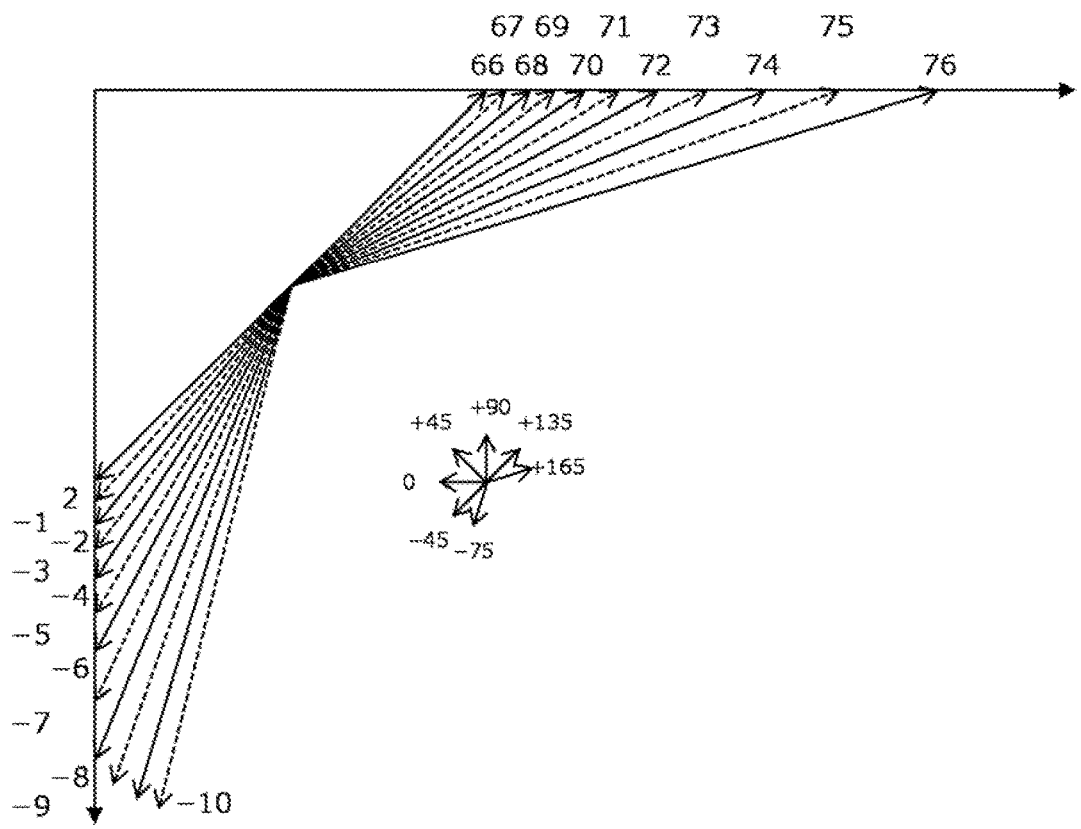

| INTRA PREDICTION MODE OF UPPER NEIGHBORING BLOCK | DC OR PLANAR | HORIZONTAL | DC OR PLANAR | VERTICAL | DC OR PLANAR | HORIZONTAL | HORIZONTAL | VERTICAL |
|---|---|---|---|---|---|---|---|---|
| INTRA PREDICTION MODE OF LEFT NEIGHBORING BLOCK | DC OR PLANAR | DC OR PLANAR | HORIZONTAL | DC OR PLANAR | VERTICAL | HORIZONTAL | VERTICAL | VERTICAL |
| MSB PREDICTED VALUE | 0 | 0 | 0 | 1 | 1 | 0 | 0 | 0 |

ENCODING APPARATUS, ENCODING METHOD, AND DECODING APPARATUS

CROSS-REFERENCE TO RELATED APPLICATION

This application is a continuation application of International Application PCT/JP2018/034886 filed on Sep. 20, 2018 and designated the U.S., the entire contents of which are incorporated herein by reference.

FIELD

The embodiments discussed herein are related to an encoding apparatus, an encoding method, a decoding apparatus, a decoding method, and a recording medium.

BACKGROUND

H. 265/HEVC is known as an international standard for compression encoding of video data. H. 265/HEVC employs two prediction methods named intra prediction and inter prediction, and specifies three types of prediction modes (planar prediction, direct current (DC) prediction, and angular prediction) for the intra prediction.

The related art is described, for example, in "Description of SDR and HDR video coding technology proposal by Ericsson and Nokia", JVET-J0012, April 2018, and "Versatile Video Coding (Draft 2)", JVET-K1001, July 2018.

SUMMARY

According to an aspect of the embodiments, an encoding apparatus includes: a memory; and a processor coupled to the memory and configured to: generate a value corresponding to a reference direction selected in intra prediction for a process target block by converting a value indicating the reference direction in accordance with a shape of the process target block; calculate a predicted value in the process target block from the values corresponding to the reference directions generated in intra prediction for neighboring blocks adjacent to the process target block; and generate a binary signal for arithmetic encoding based on the predicted value and the value corresponding to the reference direction generated in the intra prediction for the process target block.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram illustrating examples of process target blocks for use in intra prediction of the WC standard;

FIG. 7 is a diagram for explaining second intra prediction mode numbers defined in the WC standard;

DESCRIPTION OF EMBODIMENTS

Figure 1:
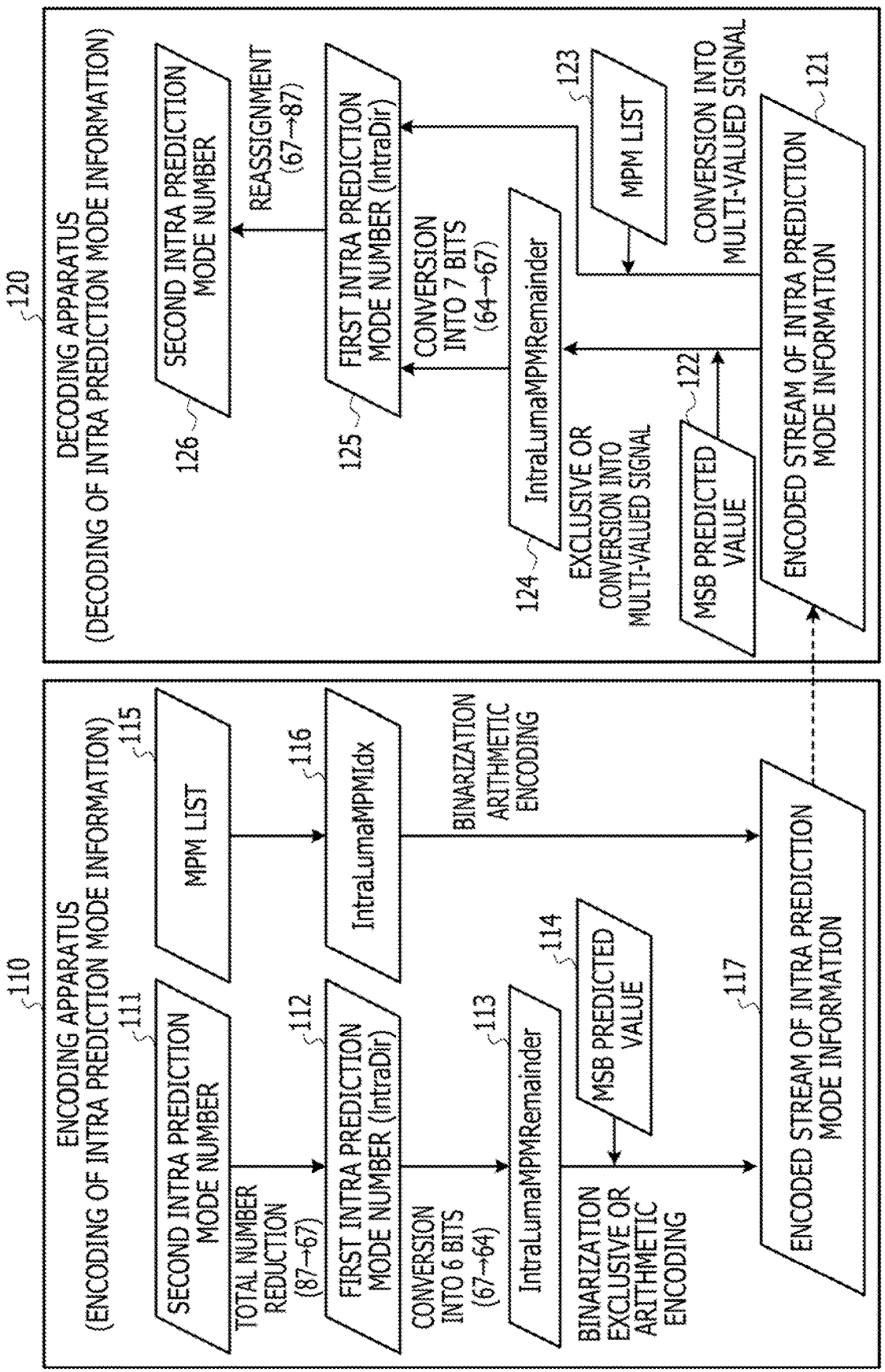
FIG. 1 is a diagram for explaining an overview of encoding processing and decoding processing of intra prediction mode information.

In the intra prediction in the angular prediction mode among these modes, each pixel value in a process target block is predicted by referring to a reference direction selected from among N different angles (reference directions) defined in advance.

In the case of the intra prediction in the angular prediction mode, an encoding apparatus generates an encoded stream of a binary signal having a number of bits corresponding to the number (N) of the reference directions by arithmetic encoding using an occurrence probability model.

As for a binary signal for which a probability of occurrence is difficult to estimate, the encoding apparatus in the related art arithmetically encodes the binary signal by using a bypass mode in which the probability of occurrence is fixed to 0.5. Therefore, such binary signal has a problem of an insufficient reduction in the code amount in the generation of an encoded stream. This problem may also occur in Versatile Video Codec (WC), which is the next generation international standard for compression encoding of video data.

In one aspect, a code amount in intra prediction may be reduced.

Hereinafter, the embodiments will be described with reference to the accompanying drawings. In the present specification and drawings, components having substantially the same functional configurations will be assigned the same reference numerals, and redundant description will be omitted.

First Embodiment

<Overviews of Encoding Processing and Decoding Processing on Intra Prediction Mode Information>

First, description will be given of overviews of encoding processing on intra prediction mode information in intra prediction performed by an encoding apparatus according to a first embodiment and decoding processing in which a compatible decoding apparatus decodes an encoded stream of the intra prediction mode information.

Here, the intra prediction modes include a DC prediction mode, a planar prediction mode, and an angular prediction mode. The intra prediction mode information is information for specifying which intra prediction mode was used to perform the intra prediction.

FIG. 1 is a diagram for explaining the overviews of the encoding processing and the decoding processing on intra prediction mode information.

In a case where intra prediction is performed on a process target block, an encoding apparatus 110 selects a second intra prediction mode number (reference numeral 111). Each second intra prediction mode number (reference numeral 111) is a value indicating a reference direction, and indicates any of:
  any number among numbers each indicating a reference direction in which the process target block may refer in the intra prediction in the angular prediction mode;
  a number indicating the DC prediction mode; and
  a number indicating the planar prediction mode.

In the WC standard, which is the next generation international standard, 87 reference directions are defined as reference directions in which a process target block may refer.

Subsequently, the encoding apparatus 110 converts the second intra prediction mode number (reference numeral 111) in accordance with the shape of the process target block such that the total number of the numbers indicating the reference directions in which the process target block may refer will be reduced from 87 to 67. Accordingly, the encoding apparatus 110 generates a first intra prediction mode number (reference numeral 112) as a converted number (a value corresponding to the reference direction). In the following description, either the first intra prediction mode numbers (reference numeral 112) or the second intra prediction mode numbers (reference numeral 111) may be simply referred to as the intra prediction mode numbers.

Subsequently, the encoding apparatus 110 converts the first intra prediction mode number (reference numeral 112) into a number in 6 bits by reducing the total number of the numbers indicating the reference directions in which the process target block may refer from 67 to 64. As a result, the encoding apparatus 110 obtains IntraLumaMPMRemainder (reference numeral 113) as the converted number.

Then, the encoding apparatus 110 binarizes IntraLumaMPMRemainder (reference numeral 113) to generate a binary signal. The encoding apparatus 110 calculates and an exclusive OR of the generated binary signal and an MSB predicted value (reference numeral 114) and then arithmetically encodes the resultant binary signal to generate an encoded stream (reference numeral 117) of the intra prediction mode information. The encoding apparatus 110 transmits the generated encoded stream (reference numeral 117) of the intra prediction mode information to a decoding apparatus 120.

The MSB predicted value (reference numeral 114) indicates a predicted value of the most significant bit (MSB) in the binary signal generated by binarizing IntraLumaMPMRemainder.

In some cases, the encoding apparatus 110 performs the intra prediction on the process target block by using the same intra prediction mode number as the intra prediction mode number used to perform the intra prediction on an already-processed neighboring block of the process target block. In this case, the encoding apparatus 110 sets, as the intra prediction mode information, information indicating that the intra prediction mode number is the same as the intra prediction mode number used to perform the intra prediction on the already-processed neighboring block.

In order to use such information as the intra prediction mode information, the encoding apparatus 110 generates an MPM list (reference numeral 115). The MPM list is a list of the intra prediction mode numbers which were used to perform the intra prediction on each neighboring block.

Subsequently, the encoding apparatus 110 generates IntraLumaMPMIdx (reference numeral 116). IntraLumaMPMIdx (reference numeral 116) is information indicating which of the intra prediction mode numbers used to perform the intra prediction on the neighboring block is the same as each of the intra prediction mode numbers used to perform the intra prediction on the process target block.

The encoding apparatus 110 binarizes IntraLumaMPMIdx (reference numeral 116) to generate a binary signal and arithmetically encodes the binary signal to generate an encoded stream of the intra prediction mode information (reference numeral 117). The encoding apparatus 110 transmits the generated encoded stream of the intra prediction mode information (reference numeral 117) to the decoding apparatus 120.

In this way, the encoding apparatus 110 encodes any one of
  IntraLumaMPMRemainder (reference numeral 113), and
  IntraLumaMPMIdx (reference numeral 116)
  as the intra prediction mode information.
  The encoding apparatus 110 also encodes
  IntraLumaMPMFlag indicating which one of the above two is encoded as the intra prediction mode information.

Here, IntraLumaMPMFlag=0 indicates that the encoding apparatus 110 encoded IntraLumaMPMRemainder as the intra prediction mode information. Then, IntraLumaMPMFlag=1 indicates that the encoding apparatus 110 encoded IntraLumaMPMIdx as the intra prediction mode information.

Meanwhile, when receiving the encoded stream of the intra prediction mode information (reference numeral 117), the decoding apparatus 120 first decodes the encoded stream and obtains the decoded intra prediction mode information (reference numeral 121).

Subsequently, the decoding apparatus 120 makes a determination concerning IntraLumaMPMFlag included in the decoded intra prediction mode information (reference numeral 121). If IntraLumaMPMFlag is 0 as a result of the determination, the decoding apparatus 120 obtains the binary signal of IntraLumaMPMRemainder included in the decoded intra prediction mode information (reference numeral 121).

Subsequently, the decoding apparatus 120 calculates an exclusive OR of the obtained binary signal of IntraLumaMPMRemainder and the MSB predicted value (reference numeral 122), and converts the resultant binary signal into a multi-valued signal. As a result, the decoding apparatus 120 generates IntraLumaMPMRemainder (reference numeral 124).

Next, the decoding apparatus 120 converts IntraLumaMPMRemainder (reference numeral 124) into 7 bits to obtain any number of the 67 first intra prediction mode numbers (reference numeral 125).

On the other hand, if IntraLumaMPMFlag included in the decoded intra prediction mode information (reference numeral 121) is 1, the decoding apparatus 120 obtains the binary signal of IntraLumaMPMIdx included in the decoded intra prediction mode information (reference numeral 121).

Then, the decoding apparatus 120 converts the obtained binary signal of IntraLumaMPMIdx to the multi-valued signal, and obtains the first intra prediction mode number (reference numeral 125) from the MPM list (reference numeral 123).

Subsequently, the decoding apparatus 120 replaces the first intra prediction mode number (reference numeral 125) by reassigning an appropriate one of the 87 second intra prediction mode numbers (reference numeral 126) in accordance with the shape of the process target block.

Thus, the decoding apparatus 120 obtains the second intra prediction mode number (reference numeral 126) indicating the appropriate one of the 87 reference directions.

As described above, the encoding apparatus 110 according to the first embodiment obtains IntraLumaMPMRemainder by converting the second intra prediction mode number in accordance with the shape of the process target block. The encoding apparatus 110 according to the first embodiment calculates the MSB predicted value in encoding the binary signal of IntraLumaMPMRemainder. The encoding apparatus 110 replaces the most significant bit in the binary signal of IntraLumaMPMRemainder with the calculated MSB predicted value (reference numeral 114), and thereby increases the probability of occurrence of the most significant bit in the binary signal.

Thus, in the arithmetic encoding on the binary signal of IntraLumaMPMRemainder (reference numeral 113), the encoding apparatus 110 achieves an increase in the probability of executing the arithmetic encoding on the most significant bit in the context mode. As a result, according to the encoding apparatus 110, the code amount in the encoded signal may be reduced as compared with the case where the arithmetic encoding in the bypass mode is executed.

<Functional Configuration of Encoding Apparatus>

Next, a functional configuration of the encoding apparatus 110 will be described. An encoding program is installed in the encoding apparatus 110. By executing the program, the encoding apparatus 110 encodes video data input as an original image and transmits the encoded stream to the decoding apparatus 120.

Figure 2:
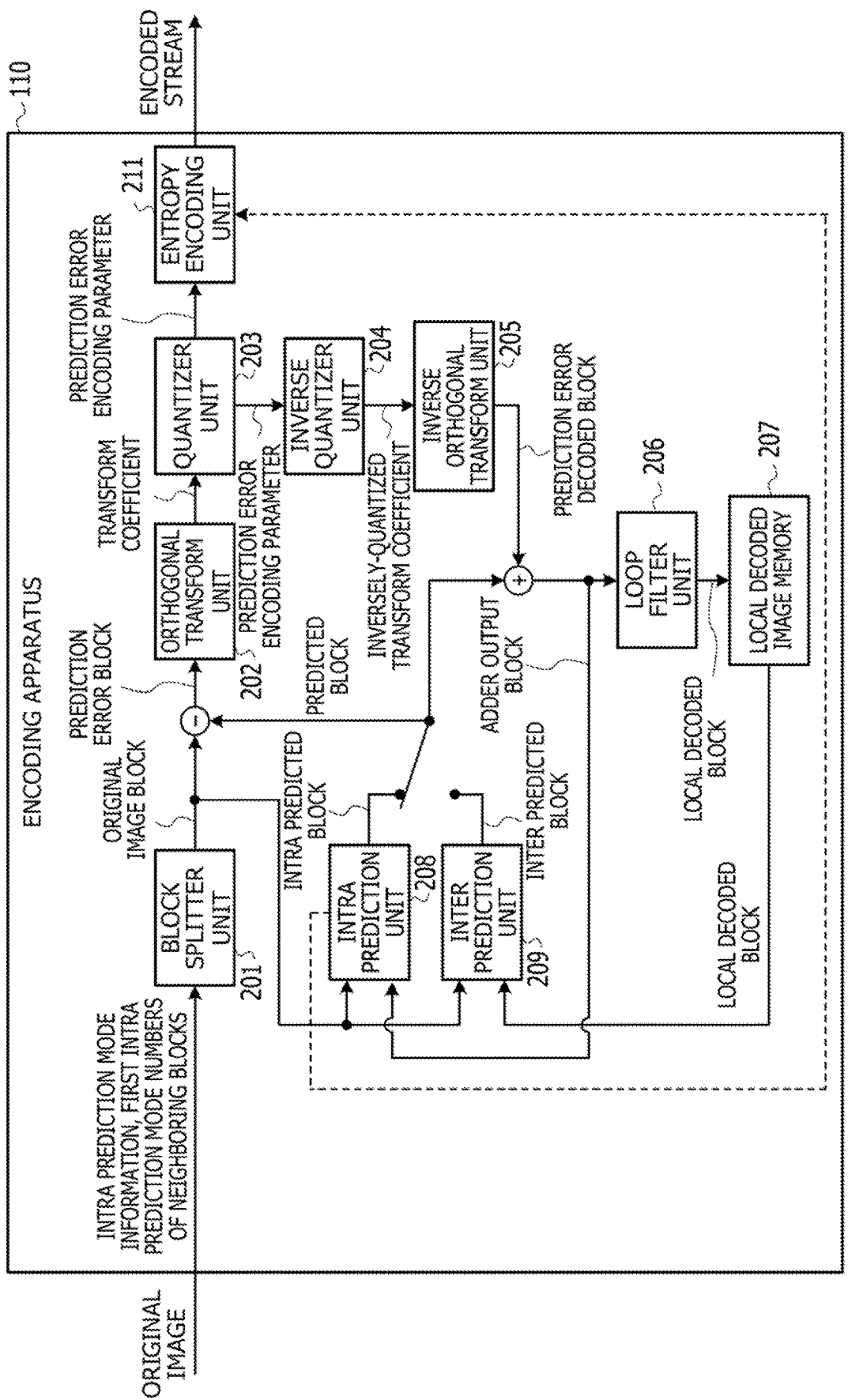
FIG. 2 is a diagram illustrating an example of a functional configuration of an encoding apparatus.

FIG. 2 is a diagram illustrating an example of a functional configuration of the encoding apparatus. As illustrated in FIG. 2, the encoding apparatus 110 includes a block splitter unit 201, an orthogonal transform unit 202, a quantizer unit 203, an inverse quantizer unit 204, and an inverse orthogonal transform unit 205. The encoding apparatus 110 also includes a loop filter unit 206, a local decoded image memory 207, an intra prediction unit 208, an inter prediction unit 209, and an entropy encoding unit 211.

The block splitter unit 201 generates original image blocks by splitting each frame included in the input video data into the multiple blocks.

The orthogonal transform unit 202 obtains a prediction error block which is a difference between each of the original image blocks generated by the block splitter unit 201 and a predicted block generated by a prediction unit (the intra prediction unit 208 or the inter prediction unit 209) to be described later. The orthogonal transform unit 202 performs orthogonal transform processing on the obtained prediction error block to calculate a transform coefficient.

The quantizer unit 203 quantizes the transform coefficient calculated by the orthogonal transform unit 202 to calculate prediction error encoding parameters.

The inverse quantizer unit 204 performs inverse quantization on the prediction error encoding parameters calculated by the quantizer unit 203 to calculate an inversely-quantized transform coefficient.

The inverse orthogonal transform unit 205 performs inverse orthogonal transform on the inversely-quantized transform coefficient calculated by the inverse quantizer unit 204 to generate a prediction error decoded block. The prediction error decoded block generated by the inverse orthogonal transform unit 205 and a predicted block generated by the prediction unit (the intra prediction unit 208 or the inter prediction unit 209) to be described later are added up to generate an adder output block.

The loop filter unit 206 performs filtering processing on the generated adder output block by using a deblocking filter or the like to generate local decoded blocks, and stores the local decoded blocks in the local decoded image memory 207.

The intra prediction unit 208 is an example of a conversion unit, performs intra prediction, and generates an intra predicted block. The following description will be given on the assumption that the intra prediction unit 208 performs intra prediction in the angular prediction mode.

For example, in performing intra prediction on a process target block among original image blocks, the intra prediction unit 208 generates an intra predicted block by referring to a neighboring block on an upper or left side of the process target block among the adder output blocks.

The intra prediction unit 208 notifies the entropy encoding unit 211 of the intra prediction mode information for the process target block. The intra prediction unit 208 further notifies the entropy encoding unit 211 of the first intra prediction mode number of the neighboring block adjacent to the process target block.

The inter prediction unit 209 performs inter prediction on a process target block among the original image blocks by using a local decoded block in another frame, and thereby generates an inter predicted block.

The encoding apparatus 110 selects any one of the intra predicted block generated by the intra prediction unit 208 and the inter predicted block generated by the inter prediction unit 209.

The selected predicted block is added to the prediction error decoded block. The selected predicted block is used to calculate a difference from the process target block among the original image blocks, and the calculated difference is input to the orthogonal transform unit 202 as a prediction error block. The following description will be given on the assumption that an intra predicted block is selected as a predicted block.

The entropy encoding unit 211 encodes the prediction error encoding parameter calculated by the quantizer unit 203. The entropy encoding unit 211 encodes various syntax elements including the intra prediction mode information notified of by the intra prediction unit 208. In order to encode the intra prediction mode information, the entropy encoding unit 211 uses the first intra prediction mode number of the neighboring block.

In this manner, the entropy encoding unit 211 encodes the prediction error encoding parameter and the various syntax elements to generate an encoded stream, and transmits the encoded stream to the decoding apparatus 120.

<Hardware Configuration of Encoding Apparatus>

Figure 3:
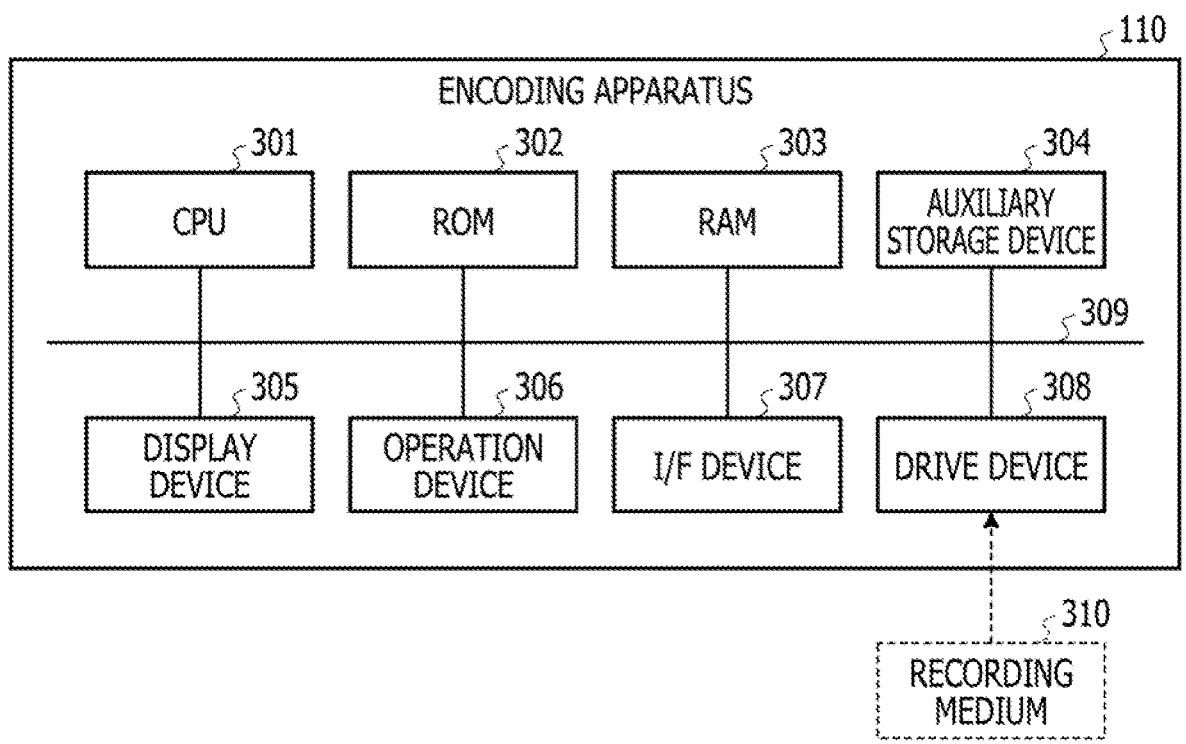
FIG. 3 is a diagram illustrating an example of a hardware configuration of the encoding apparatus.

Next, a hardware configuration of the encoding apparatus 110 will be described. FIG. 3 is a diagram illustrating an example of a hardware configuration of the encoding apparatus. As illustrated in FIG. 3, the encoding apparatus 110 includes a central processing unit (CPU) 301, a read-only memory (ROM) 302, and a random-access memory (RAM) 303. The CPU 301, the ROM 302, and the RAM 303 form a so-called computer.

The encoding apparatus 110 includes an auxiliary storage device 304, a display device 305, an operation device 306, an interface (I/F) device 307, and a drive device 308. The hardware components of the encoding apparatus 110 are coupled to each other via a bus 309.

The CPU 301 is a calculating device that runs various programs (for example, an encoding program and the like) installed in the auxiliary storage device 304.

The ROM 302 is a non-volatile memory. The ROM 302 functions as a main storage device which stores various programs, data, and so on to be used by the CPU 301 to run the various programs installed in the auxiliary storage device 304. For example, the ROM 302 functions as a main storage device that stores boot programs such as a Basic Input/Output System (BIOS) and an Extensible Firmware Interface (EFI), and so on.

The RAM 303 is a volatile memory such as a dynamic random-access memory (DRAM) or a static random-access memory (SRAM). The RAM 303 functions as a main storage device that provides a work area where the various programs installed in the auxiliary storage device 304 are expanded for execution by the CPU 301.

The auxiliary storage device 304 is an auxiliary storage device that stores various programs and data (for example, video data) to be used when the various programs are executed.

The display device 305 is a display device that displays internal states in the encoding apparatus 110. The operation device 306 is an input device with which a user of the encoding apparatus 110 inputs various instructions to the encoding apparatus 110.

The I/F device 307 is a coupling device that is coupled to another apparatus (for example, the decoding apparatus 120) and transmits and receives encoded streams to and from the other apparatus.

The drive device 308 is a device in which a recording medium 310 is set. The recording medium 310 discussed herein includes a medium that records information optically, electrically, or magnetically, such as a compact disk read-only memory (CD-ROM), a flexible disk, or a magneto-optical disk. The recording medium 310 may also include a semiconductor memory or the like that records information electrically, such as a ROM or a flash memory.

The various programs to be installed in the auxiliary storage device 304 are installed, for example, in such a way that the distributed recording medium 310 is set in the drive device 308 and the drive device 308 reads the various programs recorded in the recording medium 310. Alternatively, the various programs to be installed in the auxiliary storage device 304 may be installed by being downloaded from a network that is not illustrated.

For simplicity of explanation, FIG. 3 illustrates only the hardware configuration of the encoding apparatus 110, but the decoding apparatus 120 has the same hardware configuration.

Definitions for Intra Prediction in WC Standard

Next, definitions of process target blocks, intra prediction mode numbers, and IntraLumaMPMRemainder will be described as definitions for intra prediction in the WC standard, which is the next generation international standard.

(1) Definitions of Process Target Blocks

First, definitions of process target blocks will be described among the definitions for the intra prediction in the WC standard. FIG. 4 is a diagram illustrating examples of process target blocks used in the intra prediction in the WC standard. As process target blocks in the intra prediction, the HEVC standard uses only square blocks, whereas the WC standard also uses rectangular blocks as illustrated in FIG. 4.

In FIG. 4, a frame 400 depicts the shapes and sizes of various blocks used in the intra prediction in the WC standard, and reference numerals 410 to 430 depict the shapes and sizes of representative blocks extracted from the above blocks.

Among these, reference numeral 410 depicts blocks obtained by dividing a block having W pixels in the horizontal direction and H pixels in the vertical direction into four blocks each having W/2 pixels in the horizontal direction and H/2 pixels in the vertical direction.

Reference numeral 420 depicts blocks obtained by dividing a block having W pixels in the horizontal direction and H pixels in the vertical direction into two blocks each having W/2 pixels in the horizontal direction and H pixels in the vertical direction or two blocks each having W pixels in the horizontal direction and H/2 pixels in the vertical direction.

Reference numeral 430 depicts blocks obtained by dividing a block having W pixels in the horizontal direction and H pixels in the vertical direction into two blocks each having W/4 pixels in the horizontal direction and H pixels in the vertical direction and one block having W/2 pixels in the horizontal direction and H pixels in the vertical direction. Alternatively, reference numeral 430 depicts blocks obtained by dividing a block having W pixels in the horizontal direction and H pixels in the vertical direction into two blocks each having W pixels in the horizontal direction and H/4 pixels in the vertical direction and one block having W pixels in the horizontal direction and H/2 pixels in the vertical direction.

As described above, the WC standard uses the rectangular blocks having various shapes and sizes. The example of FIG. 4 presents the rectangular blocks having aspect ratios of 1:2 and 2:1, but any rectangular block having an aspect ratio other than 1:2 or 2:1 may be used.

(2) Definitions for Intra Prediction Mode Numbers

Next, among the definitions for the intra prediction in the WC standard, the definitions for the intra prediction mode numbers will be described in comparison with the definitions for the intra prediction mode numbers in the HEVC standard.

(2-1) Case of HEVC Standard

Figure 5:
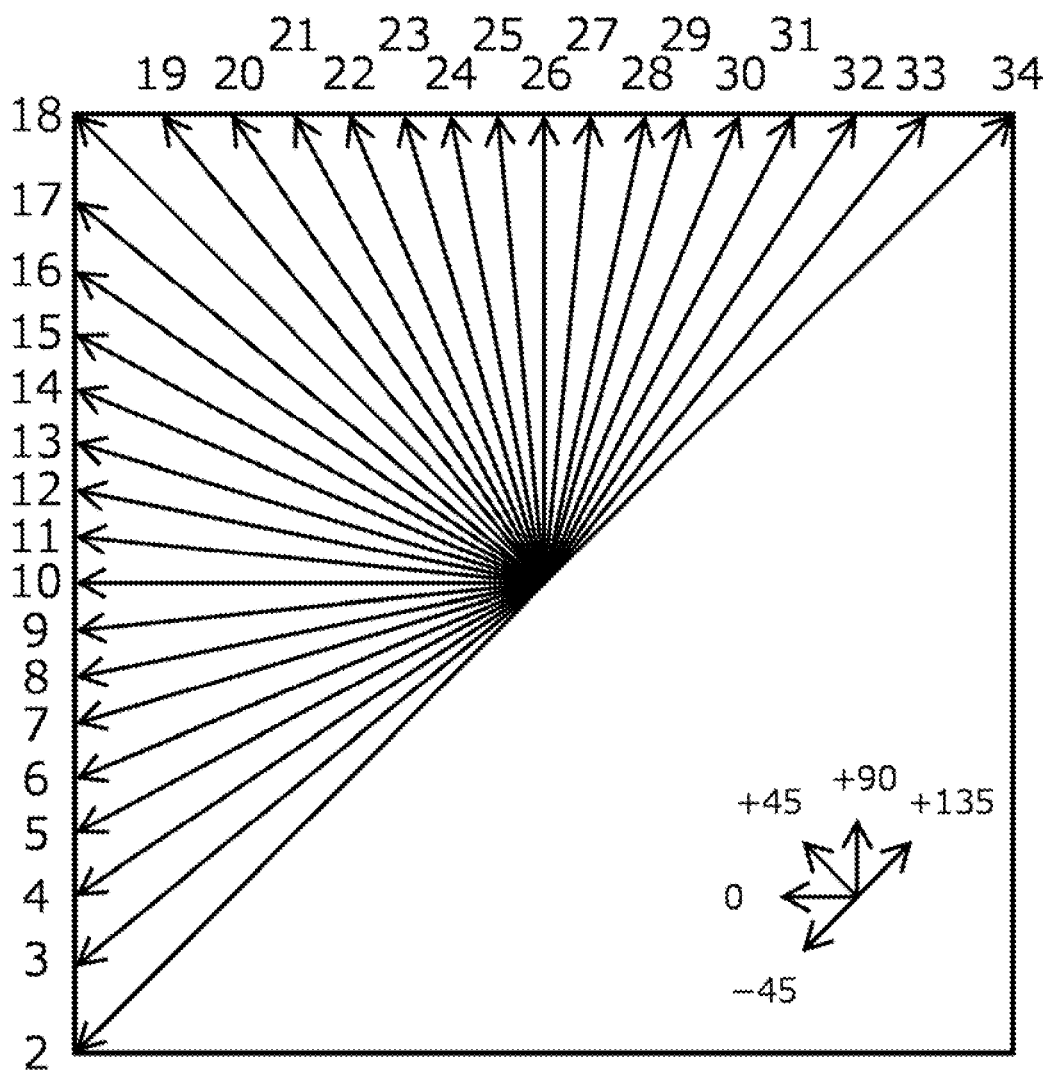
FIG. 5 is a diagram illustrating reference directions in intra prediction and intra prediction mode numbers defined in the HEVC standard.

FIG. 5 is a diagram illustrating reference directions in the intra prediction and intra prediction mode numbers defined in the HEVC standard.

In the intra prediction, pixel values in a block (adder output block) which is processed earlier in a raster scan order is set as predicted pixel values. Therefore, as illustrated in FIG. 5, the reference directions are defined in a clockwise range from a left lower direction to a right upper direction in a frame (a range of −45° to +135° where the left horizontal direction is defined as 0°).

As illustrated in FIG. 5, 33 intra prediction mode numbers No. 2 to No. 34 in the angular prediction mode are assigned to angles in the order from −45° to +135°. The numbers No. 0 and No. 1 are assigned to intra prediction mode numbers in the planar prediction mode and the DC prediction mode (the prediction modes without spatial directionality), respectively.

In the intra prediction mode of the angular prediction mode, a predicted pixel value of each of the pixels in a process target block is generated by performing extrapolation according to a reference direction specified among the 33 reference directions.

(2-2) Reference Directions in WC Standard

Figure 6:
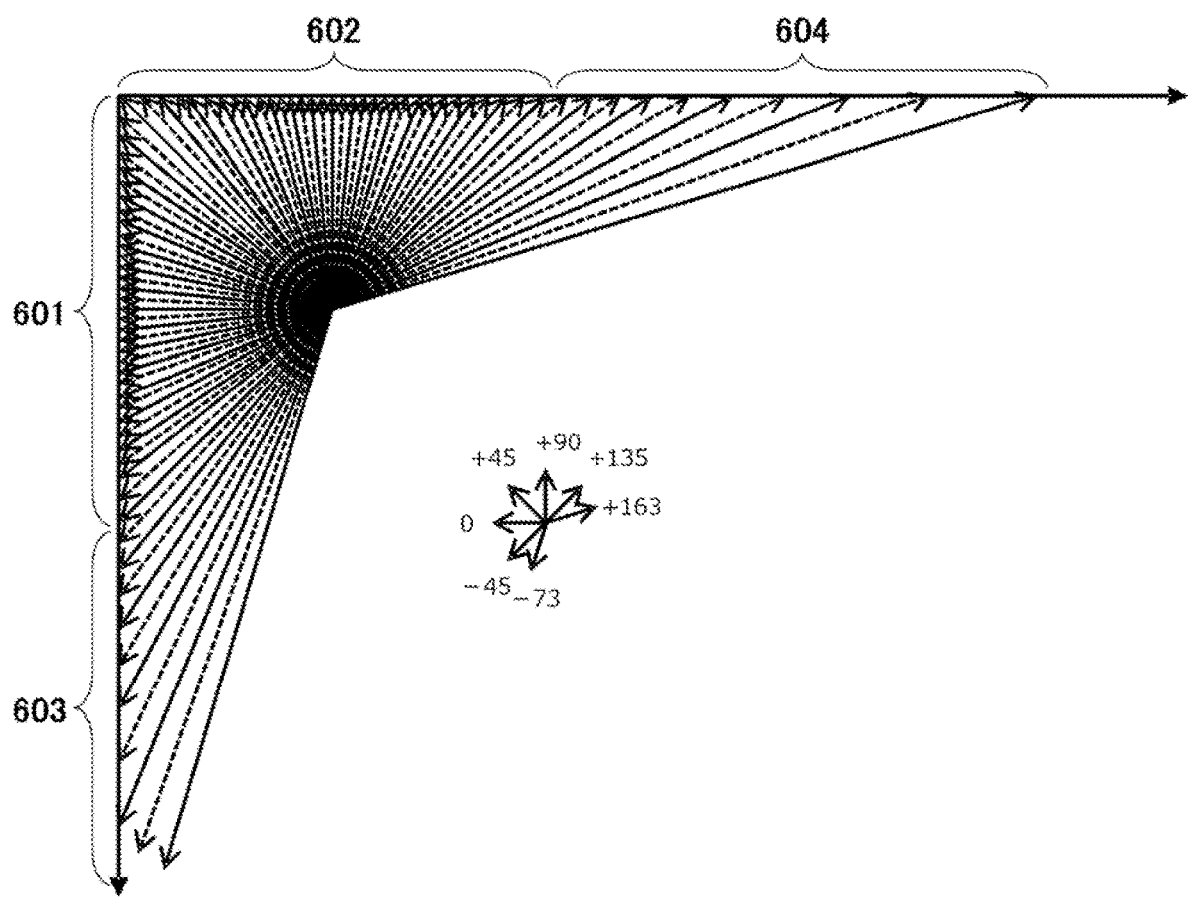
FIG. 6 is a diagram illustrating reference directions in intra prediction defined in the WC standard.

FIG. 6 is a diagram illustrating reference directions in the intra prediction defined in the WC standard. In the case of the WC standard, the number of reference directions is twice as large as that in the HEVC standard. The WC standard uses an increased range of reference directions in consideration of a case where the process target block is non-square (−73° to −45° and +135° to +163° are added).

In FIG. 6, reference numeral 601 depicts a range of −45° to +45°, including the reference directions in the case where a process target block is square. Reference numeral 602 depicts a range of +45° to +135°, including the reference directions in the case where the process target block is square.

Meanwhile, reference numeral 603 depicts a range of −73° to −45°, which is added as reference directions in the case where a process target block is non-square. Reference numeral 604 depicts a range of +135° to +163° added as reference directions in the case where the process target block is non-square.

In the case of the WC standard, the total number of second intra prediction mode numbers is 87, which is a sum of 85 angular prediction mode numbers having reference directions, one planar prediction mode number, and one DC prediction mode number.

(2-3) Second Intra Prediction Mode Numbers

Next, description will be given of assignment of the 87 second intra prediction mode numbers including the angular prediction mode numbers having reference directions, the planar prediction mode number, and the DC prediction mode number defined in the WC standard. FIG. 7 is a diagram for explaining the second intra prediction mode numbers defined in the WC standard.

As illustrated in FIG. 7, second intra prediction mode numbers No. 2 to No. 66 in the angular prediction mode are assigned to angles in the order from −45° to +135°. The numbers No. 0 and No. 1 are assigned to the second intra prediction mode numbers in the planar prediction mode and the DC prediction mode, respectively.

In addition, second intra prediction mode numbers No. 67 to No. 76 in the angular prediction mode are assigned to angles of +135° and greater. Then, second intra prediction mode numbers No. −10 to No. −1 in the angular prediction mode are assigned to angles of −73° to −45°.

(2-4) First Intra Prediction Mode Numbers

Here, in the WC standard, as described with reference to FIG. 1, the totally 87 second intra prediction mode numbers (reference numeral 111) are reduced to the totally 67 first intra prediction mode numbers (reference numeral 112).

This is because use of the totally 87 intra prediction mode numbers makes it possible to reduce a prediction error as compared with the HEVC standard, but also leads to an increase in the code amount of the intra prediction mode information encoded.

Figure 8:
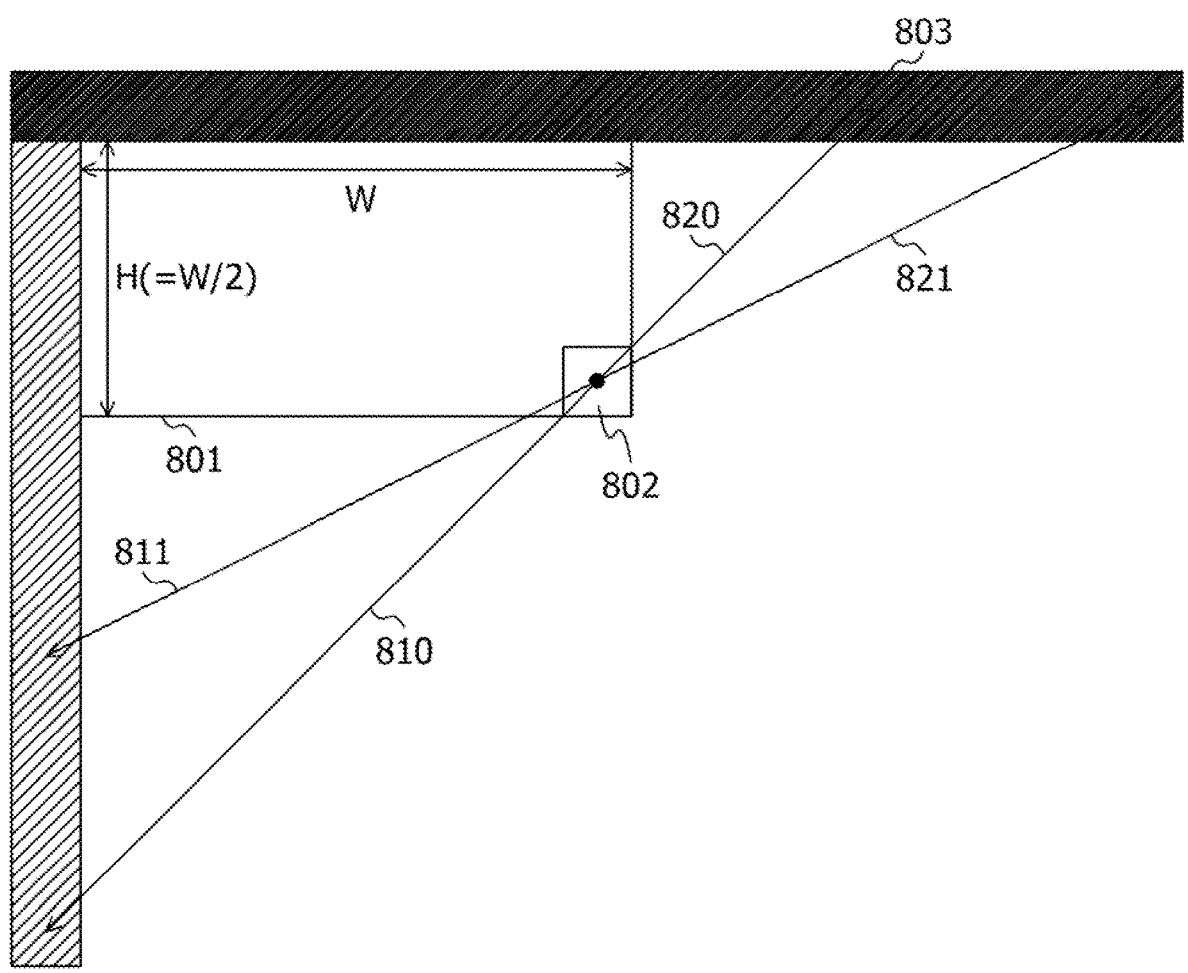
FIG. 8 is a diagram for explaining a method of reducing the total number of intra prediction mode numbers.

FIG. 8 is a diagram for explaining a method of reducing the total number of intra prediction mode numbers. In FIG. 8, a process target block 801 has W pixels in the horizontal direction and W/2 pixels in the vertical direction. A pixel 802 is a pixel located at the rightmost bottom of the process target block 801, and a pixel 803 is a pixel neighboring the process target block 801 and referred to in the intra prediction in the angular prediction mode.

Arrows 810, 811, 820, and 821 respectively indicate reference directions of −45°, −30°, +135°, and +150° with respect to the pixel 802. The pixels located at the tip ends of the arrows 810, 811, 820, and 821 are pixels referred to by the pixel 802. For example, the pixel values of the pixels located at the tip ends of the arrows 810, 811, 820, and 821 are usable as a predicted pixel value of the pixel 802.

The prediction performance of the intra prediction in the angular prediction mode is inversely proportional to the distance between a prediction target pixel (here, the pixel 802) and the reference pixel (here, the pixel located at the tip end of each of the arrows 810, 811, 820, and 821). For example, as the distance between the prediction target pixel and the reference pixel is shorter, the prediction error is smaller and the encoding efficiency is improved.

In the example of FIG. 8, the distance to the reference pixel in the reference direction of −45° (the pixel located at the tip end of the arrow 810) is longer than the distance to the reference pixel in the reference direction of +135° (the pixel located at the tip end of the arrow 820), which is on the same diagonal line.

In the case of a square process target block, the above two distances are equal to each other. On the other hand, in the case of a rectangular process target block as illustrated in FIG. 8, the reference pixels on the same line have an equal distance to the pixel 802 when located at angles in the reference direction of −30° and the reference direction of +150°.

For example, when the aspect ratio of the process target block is 1:2, a reference direction at an angle in a range of −30° to −45° brings about only low prediction performance of the intra prediction in the angular prediction mode and therefore is actually selected with a low probability. For example, in a case where there is a uniform texture around a process target block and the direction thereof is parallel to the arrows 810 and 820, the prediction efficiency may be expected to improve when the reference direction of the arrow 820 is selected instead of the reference direction of the arrow 810.

In the WC standard, the intra prediction mode numbers are reassigned by using this such that the total number of the intra prediction mode numbers is 67 (equal to the total number in the HEVC standard).

For example, in a case where
- a reference direction selected in the intra prediction allows the intra prediction even when reversed by 180°, and
- a distance to the reference pixel in the selected reference direction is longer than a distance to the reference pixel in the reference direction reversed by 180°, the value indicating the reference direction reversed by 180° is used.

In this manner, in the WC standard, the 87 second intra prediction mode numbers (reference numeral 111) are converted into the 67 first intra prediction mode numbers (reference numeral 112) to reduce the total number.

(2-5) Specific Example of Total Number Reduction Processing

A specific example of processing of reducing the total number of the second intra prediction mode numbers will be described with reference to FIG. 6.

In the case of the WC standard, whether a process target block is a horizontally long block or a vertically long block is determined based on the number of pixels in the horizontal direction and the number of pixels in the vertical direction in the process target block.

If the block is determined as a horizontally long block, angles obtained by reversing the reference directions depicted with reference numeral 604 by 180° (10 directions depicted with reference numeral 601 in order from the bottom to an upper side) are identified in the WC standard. The WC standard does not use the identified 10 directions as the reference directions but replaces the second intra prediction mode numbers in these 10 directions with the corresponding first intra prediction mode numbers in the reference directions depicted with reference numeral 604. For example, in the WC standard, the second intra prediction mode numbers 2 to 11 are converted to 67 to 76, respectively, with an addition of 65.

On the other hand, if the block is determined as a vertically long block, the angles obtained by reversing the reference directions depicted with reference numeral 603 by 180° (10 directions depicted with reference numeral 602 in order from the rightmost to a left side) are identified in the WC standard. The WC standard does not use the identified 10 directions as the reference directions, but replaces the second intra prediction mode numbers in these 10 directions with the corresponding first intra prediction mode numbers in the reference directions depicted with reference numeral 602. For example, in the WC standard, the second intra prediction mode numbers NO. 57 to No. 66 are converted to No. −10 to No. −1, with a subtraction of 67.

If the block is determined to be other than the above, the second intra prediction mode numbers are not converted in the WC standard. Therefore, the first intra prediction mode numbers are the same as the second intra prediction mode numbers. For example, when the second intra prediction mode numbers are 12 to 56, the first intra prediction mode numbers are 12 to 56.

The processing of converting the second intra prediction mode numbers into the first intra prediction mode numbers while reducing the total number of intra prediction mode numbers as described above in the WC standard may be summarized as follows. In the following description, M1 represents the first intra prediction mode number, and M2 represents the second intra prediction mode number.

In the case where the number of pixels in horizontal direction (W)=the number of pixels in vertical direction (H)

$M1=M2$,

In the case where the number of pixels in horizontal direction (W)>the number of pixels in vertical direction (H)

$M1=M2+65$ if $2\le M2<mL$, where mL=8 if W=2H and mL=12 if W>2H, or $M1=M2$ otherwise.

In the case where the number of pixels in horizontal direction (W)<the number of pixels in vertical direction (H), $M1=M2-67$ if $mH<M2\le 66$, where mH=60 if H=2 W and mH=56 if H>2 W, or $M1=M2$ otherwise.

In accordance with the above, it is possible to convert the second intra prediction mode numbers (M2) into the first intra prediction mode numbers (M1) in the WC standard.

(3) Description of IntraLumaMPMRemainder

Next, description will be given of processing of deriving IntraLumaMPMRemainder (reference numeral 113) by converting the total number (67) of the first intra prediction mode numbers into the total number in 6 bits. Here, the first intra prediction mode number (reference numeral 112) is referred to as IntraDir.

According to the WC standard, IntraLumaMPMRemainder may be derived by the following procedure.

i) First, IntraLumaMPMRemainder=IntraDir is set.

ii) Next, entries of most probable modes (MPM) are sorted in ascending order to obtain mpm_sort[i] (i=0, . . . , 2, mpm_sort[0]<mpm_sort[1]<mpm_sort[2]).

iii) Subsequently, mpm_sort[i] and IntraLumaMPMRemainder are sequentially compared.

iv) If mpm_sort[i]<=IntraLumaMPMRemainder holds as a result of the comparison, IntraLumaMPMRemainder is decremented by 1.

In this way, according to the WC standard, it is possible to derive IntraLumaMPMRemainder based on the first intra prediction mode number (reference numeral 112). The final IntraLumaMPMRemainder derived by the above procedure is smaller than the first intra prediction mode number (reference numeral 112) by at most "3".

<Functional Configuration of Intra Prediction Unit>

Figure 9:
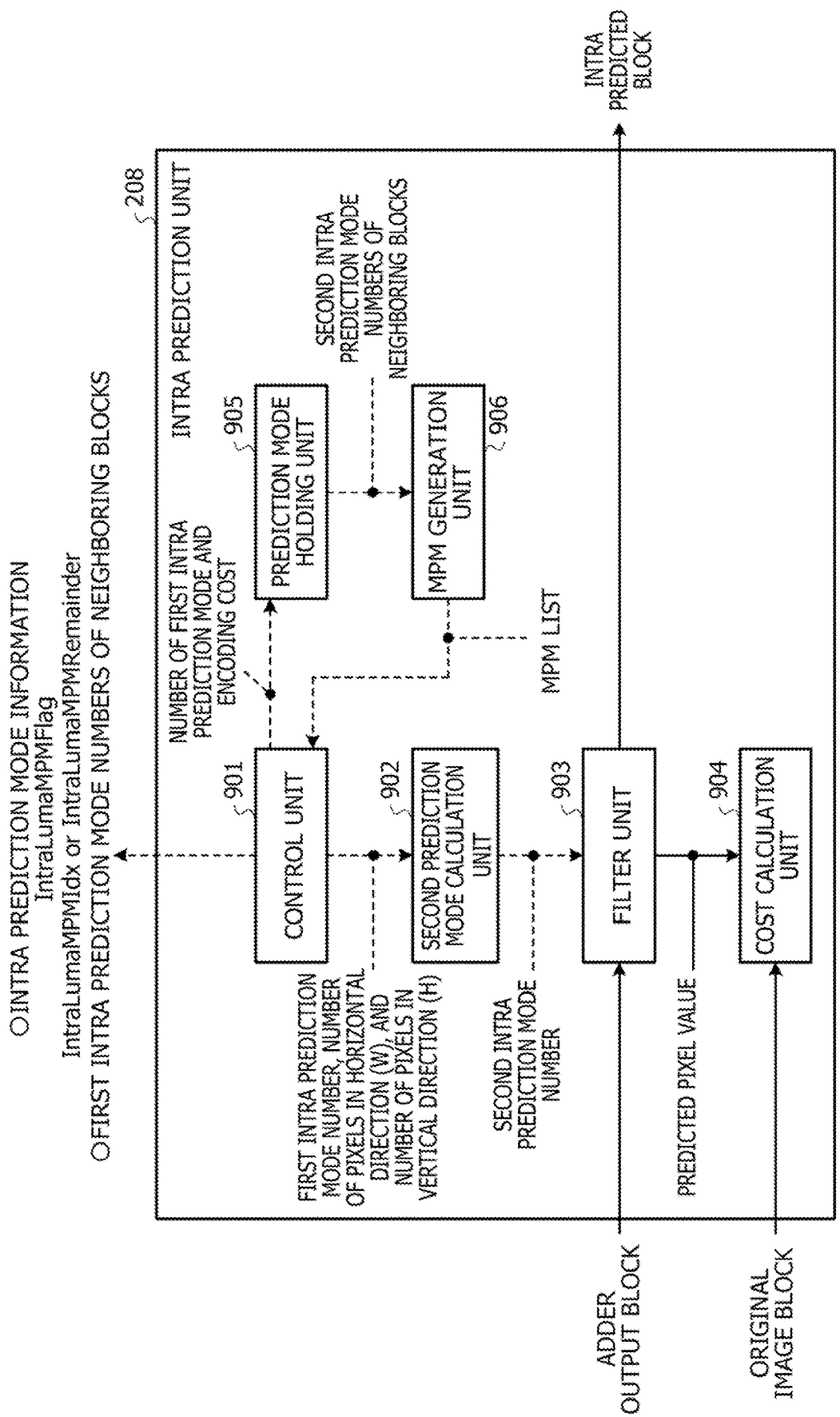
FIG. 9 is a diagram illustrating an example of a functional configuration of an intra prediction unit of the encoding apparatus.

Next, a functional configuration of the intra prediction unit 208 of the encoding apparatus 110 will be described. FIG. 9 is a diagram illustrating an example of a functional configuration of the intra prediction unit of the encoding apparatus. As illustrated in FIG. 9, the intra prediction unit 208 includes a control unit 901, a second prediction mode calculation unit 902, a filter unit 903, a cost calculation unit 904, a prediction mode holding unit 905, and an MPM generation unit 906.

The control unit 901 selects the intra prediction mode information for a process target block. For example, the control unit 901 notifies the second prediction mode calculation unit 902 of the first intra prediction mode numbers one after another as a cost evaluation target. The control unit 901 notifies the second prediction mode calculation unit 902 of the number of pixels in the horizontal direction (W) and the number of pixels in the vertical direction (H) in the process target block.

The control unit 901 calculates IntraLumaMPMRemainder for the first intra prediction mode number with which the encoding cost calculated by the cost calculation unit 904 is the lowest.

Alternatively, the control unit 901 identifies the second intra prediction mode number corresponding to the first intra prediction mode number with which the encoding cost calculated by the cost calculation unit 904 is the lowest, and refers to the MPM list generated by the MPM generation unit 906. The control unit 901 determines whether the identified second intra prediction mode number matches the second intra prediction mode number in the MPM list, which was used to perform the intra prediction on a block neighboring the process target block. If the control unit 901 determines that the numbers match, the control unit 901 generates IntraLumaMPMIdx for specifying the second intra prediction mode number in the MPM list.

In this way, in the control unit 901 selects the intra prediction mode information containing
IntraLumaMPMFlag and
either IntraLumaMPMIdx or IntraLumaMPMRemainder.

The control unit 901 notifies the entropy encoding unit 211 of the selected intra prediction mode information. The control unit 901 sets IntraLumaMPMFlag=1 for the notification of IntraLumaMPMIdx, and sets IntraLumaMPMFlag=0 for the notification of IntraLumaMPMRemainder.

The control unit 901 obtains, from the MPM list, the second intra prediction mode number used to perform the intra prediction on the block neighboring the process target block, and converts the second intra prediction mode number into the first intra prediction mode number. In this way, the control unit 901 obtains the first intra prediction mode number of the neighboring block. The control unit 901 notifies the entropy encoding unit 211 of the first intra prediction mode number of the neighboring block.

The second prediction mode calculation unit 902 converts the first intra prediction mode number notified of as the cost evaluation target by the control unit 901 into the second intra prediction mode number based on the number of pixels in the horizontal direction (W) and the number of pixels in the vertical direction (H) in the process target block. The second prediction mode calculation unit 902 notifies the filter unit 903 of the second intra prediction mode number.

The filter unit 903 performs a filter operation based on the reference direction corresponding to the second intra prediction mode number on the pixel value in the block neighboring the process target block among the adder output blocks, and calculates the predicted pixel value. The filter unit 903 outputs, as an intra predicted block, the predicted pixel value obtained by performing the filter operation based on the reference direction corresponding to the second intra prediction mode number with which the encoding cost is the lowest.

The cost calculation unit 904 subtracts the predicted pixel values obtained in the filter operation by the filter unit 903 from the process target block among the original image blocks, and calculates the encoding cost. The cost calculation unit 904 calculates the encoding cost by adding up a distortion amount (intensity of prediction error) and an amount of data obtained by multiplying a quantized value by a weight that increases in proportion to the quantized value. The cost calculation unit 904 calculates the amount of data by adding up an amount of data generated when the prediction error is virtually encoded and an amount of data of the intra prediction mode information to be output to the entropy encoding unit 211.

If IntraLumaMPMRemainder is included in the intra prediction mode information, the cost calculation unit 904
calculates the encoding cost with the amount of data of IntraLumaMPMRemainder fixed to 6 bits, or
calculates the encoding cost by using, as the amount of data, the amount of bits calculated based on the entropy of the probability of occurrence that the exclusive OR of the most significant bit in the binary signal of IntraLumaMPMRemainder and the MSB predicted value is 0.

In this calculation, as the probability of occurrence that the exclusive OR is 0, it is possible to use the probability of occurrence calculated for the immediately preceding process target block by the entropy encoding unit 211. Alternatively, it is possible to use the probability of occurrence calculated by the entropy encoding unit 211 for the last block in the immediately preceding picture.

The cost calculation unit 904 determines whether or not the calculated encoding cost is lower than the already calculated encoding cost. If the cost calculation unit 904 determines that the encoding cost is lower than the already calculated encoding cost, the cost calculation unit 904 notifies the control unit 901 of the determination result and the encoding cost. Thus, the control unit 901 notifies the prediction mode holding unit 905 of the corresponding first intra prediction mode number and the encoding cost.

The cost calculation unit 904 calculates the encoding costs for all the first intra prediction mode numbers, so that the control unit 901 may select the intra prediction mode information.

The prediction mode holding unit 905 holds the second intra prediction mode number corresponding to the first intra prediction mode number notified of by the control unit 901. In a case where intra prediction is not performed on the process target block, the prediction mode holding unit 905 holds the number indicating the DC prediction mode.

The prediction mode holding unit 905 outputs the held second intra prediction mode number to the MPM generation unit 906 as the second intra prediction mode number of the already-processed neighboring block.

The MPM generation unit 906 provides the control unit 901 with the second intra prediction mode number used to perform the intra prediction on the block neighboring the process target block. The MPM generation unit 906 registers the second intra prediction mode number of the already-processed neighboring block from the prediction mode holding unit 905 into the MPM list as the second intra prediction mode number of a block neighboring a next process target block.

<Sequence of Intra Prediction Processing by Intra Prediction Unit>

Figure 10:
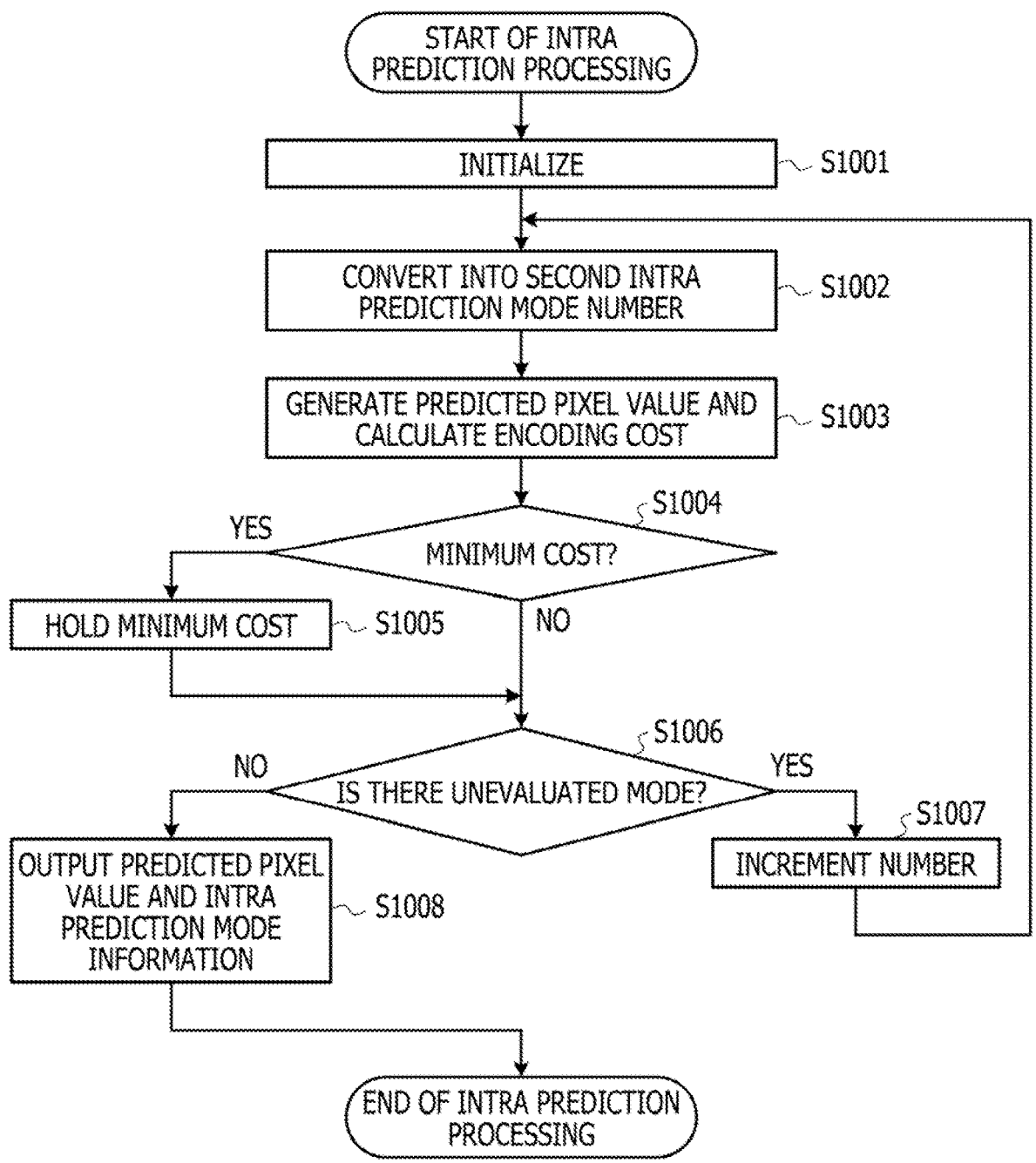
FIG. 10 is a flowchart illustrating a sequence of intra prediction processing by the intra prediction unit.

Next, a sequence of intra prediction processing by the intra prediction unit 208 will be described. FIG. 10 is a flowchart illustrating a sequence of intra prediction processing by the intra prediction unit.

In step S1001, the intra prediction unit 208 performs initialization. For example, the control unit 901 sets the first intra prediction mode number as the cost evaluation target to "0". The MPM generation unit 906 generates the MPM list. The prediction mode holding unit 905 sets a minimum cost Cm to a possible maximum value (for example, $2^{32-1}$).

In step S1002, the second prediction mode calculation unit 902 converts the first intra prediction mode number output from the control unit 901 into the second intra prediction mode number.

In step S1003, the filter unit 903 generates a predicted pixel value with reference to the adder output block located in the reference direction corresponding to the second intra prediction mode number. The cost calculation unit 904 calculates an encoding cost Ct according to the difference between the process target block among the original image blocks and the generated predicted pixel value and the amount of data of IntralumaMPMRemainder for the first intra prediction mode number.

In step S1004, the prediction mode holding unit 905 determines whether or not the encoding cost Ct is lower than the minimum cost Cm. If the encoding cost Ct is determined to be lower than the minimum cost Cm in step S1004 (Yes in step S1004), the processing proceeds to step S1005.

In step S1005, the prediction mode holding unit 905 holds the second intra prediction mode number corresponding to the first intra prediction mode number. The prediction mode holding unit 905 sets the encoding cost Ct as the minimum cost Cm and holds the predicted pixel value.

On the other hand, if the encoding cost Ct is determined to be equal to or higher than the minimum cost Cm in step S1004 (No in step S1004), the processing proceeds to step S1006.

In step S1006, the control unit 901 determines whether or not the first intra prediction mode number is less than the possible maximum value (=66). If the first intra prediction mode number is determined to be less than the maximum value in step S1006 (Yes in step S1006), the control unit 901 determines that there remains the first intra prediction mode number yet to be processed as the cost evaluation target. In this case, the control unit 901 proceeds to step S1007.

In step S1007, the control unit 901 increments the first intra prediction mode number, and then returns to step S1002.

On the other hand, if the first intra prediction mode number is determined to be equal to the maximum value in step S1006 (No in step S1006), the control unit 901 determines that all the first intra prediction mode numbers have been processed as the cost evaluation target. In this case, the control unit 901 proceeds to step S1008.

In step S1008, the filter unit 903 outputs the predicted pixel values held in the prediction mode holding unit 905 as the intra predicted block.

The control unit 901 calculates the first intra prediction mode numbers based on the second intra prediction mode numbers held in the prediction mode holding unit 905 and also generates IntraLumaMPMRemainder.

The control unit 901 refers to the MPM list based on each of the second intra prediction mode numbers held in the prediction mode holding unit 905. If the second intra prediction mode number matches the second intra prediction mode number used to perform the intra prediction on a block neighboring the process target block, the control unit 901 generates IntraLumaMPMIdx.

The control unit 901 outputs IntraLumaMPMRemainder (or IntraLumaMPMIdx) and IntraLumaMPMFlag as the intra prediction mode information to the entropy encoding unit 211.

<Functional Configuration of Entropy Encoding Unit>

Figure 11:
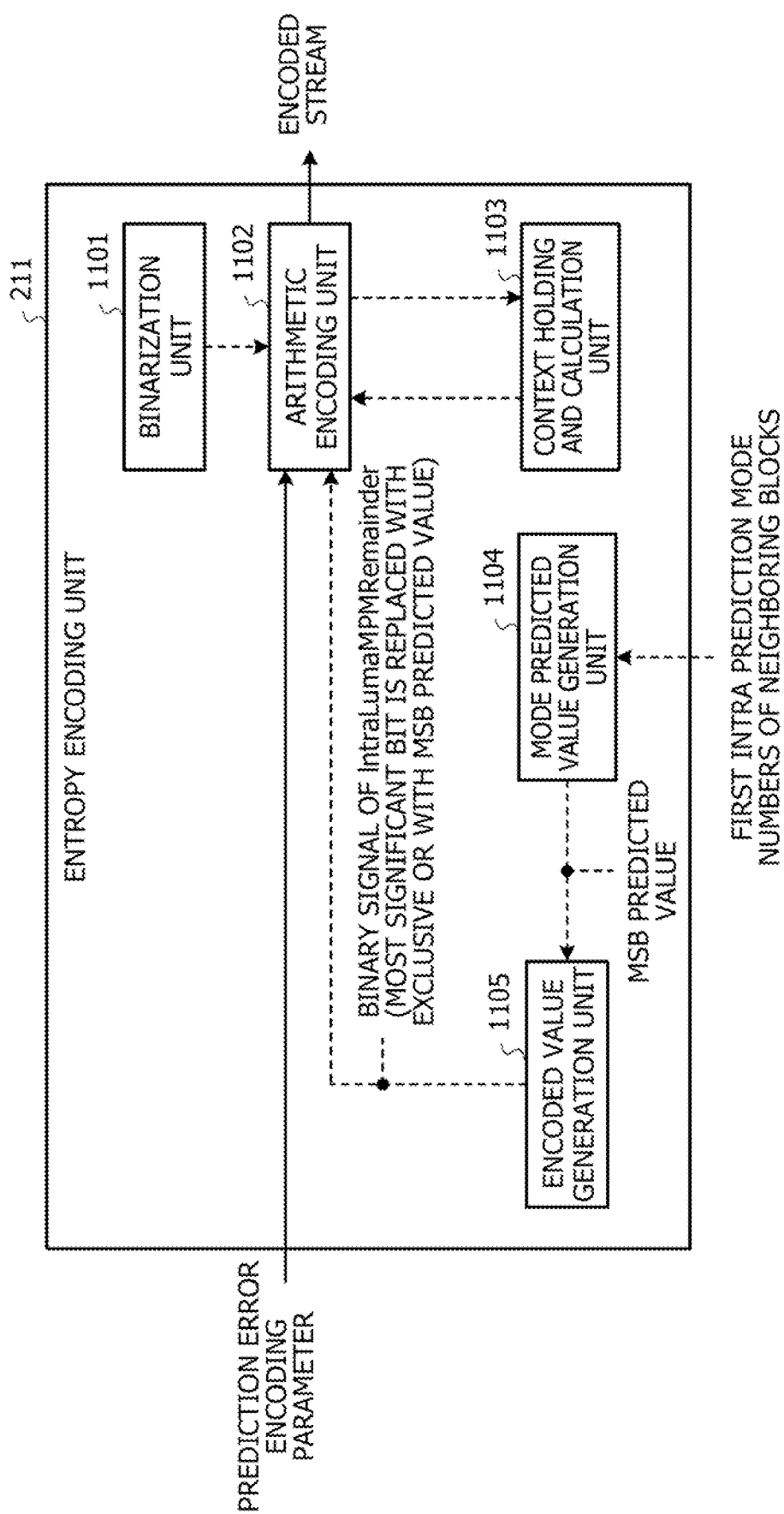
FIG. 11 is a diagram illustrating an example of a functional configuration of an entropy encoding unit of the encoding apparatus.

Next, a functional configuration of the entropy encoding unit 211 of the encoding apparatus 110 will be described. FIG. 11 is a diagram illustrating an example of the functional configuration of the entropy encoding unit of the encoding apparatus. As illustrated in FIG. 11, the entropy encoding unit 211 includes a binarization unit 1101, an arithmetic encoding unit 1102, a context holding and calculation unit 1103, a mode predicted value generation unit 1104, and an encoded value generation unit 1105.

The arithmetic encoding unit 1102 is an example of an encoding unit, and obtains a prediction error encoding parameter for a process target block, an encoding parameter (here, the intra prediction mode information) of the process target block, and an encoding parameter of a picture as an encoding target. The arithmetic encoding unit 1102 performs entropy encoding on the obtained encoding target in accordance with a context-based binary arithmetic encoding method.

The binarization unit 1101 generates binary signals for syntax elements in the encoding target. For example, the binarization unit 1101 generates the binary signals of the intra prediction mode information notified of by the intra prediction unit 208.

The context holding and calculation unit 1103 stores the entropy-encoded binary signal of each syntax element, calculates context values (a most probable symbol (MPS) and a probability of occurrence thereof) of the syntax element of the process target block, and updates them.

For example, the context holding and calculation unit 1103 calculates and stores the MPS and the probability of occurrence thereof for each of the bits in the binary signal of IntraLumaMPMRemainder for the process target block.

The mode predicted value generation unit 1104 is an example of a calculation unit, and stores the first intra prediction mode numbers of the neighboring blocks when notified of the first intra prediction mode numbers by the intra prediction unit 208. The mode predicted value generation unit 1104 calculates a predicted value of the most significant bit in the binary signal of IntraLumaMPMRemainder for the process target block based on the first intra prediction mode numbers of the neighboring blocks. The mode predicted value generation unit 1104 notifies the encoded value generation unit 1105 of the calculated predicted value of the most significant bit (most significant bit (MSB) predicted value).

The encoded value generation unit 1105 is an example of a generation unit, and obtains the binary signal of IntraLumaMPMRemainder among the binary signals of the intra prediction mode information generated in the binarization unit 1101. The encoded value generation unit 1105 calculates an exclusive OR of the most significant bit among the bits in the binary signal of IntraLumaMPMRemainder with the MSB predicted value calculated by the mode predicted value generation unit 1104. The encoded value generation unit 1105 notifies the arithmetic encoding unit 1102 of the binary signal of IntraLumaMPMRemainder for which the exclusive OR is calculated (the binary signal for arithmetic encoding).

Thus, in the entropy encoding on IntraLumaMPMRemainder in accordance with the binary arithmetic encoding method, the arithmetic encoding unit 1102 may perform the entropy encoding on the most significant bit in the context mode.

<Details of Processing by Binarization Unit>

Figure 12:
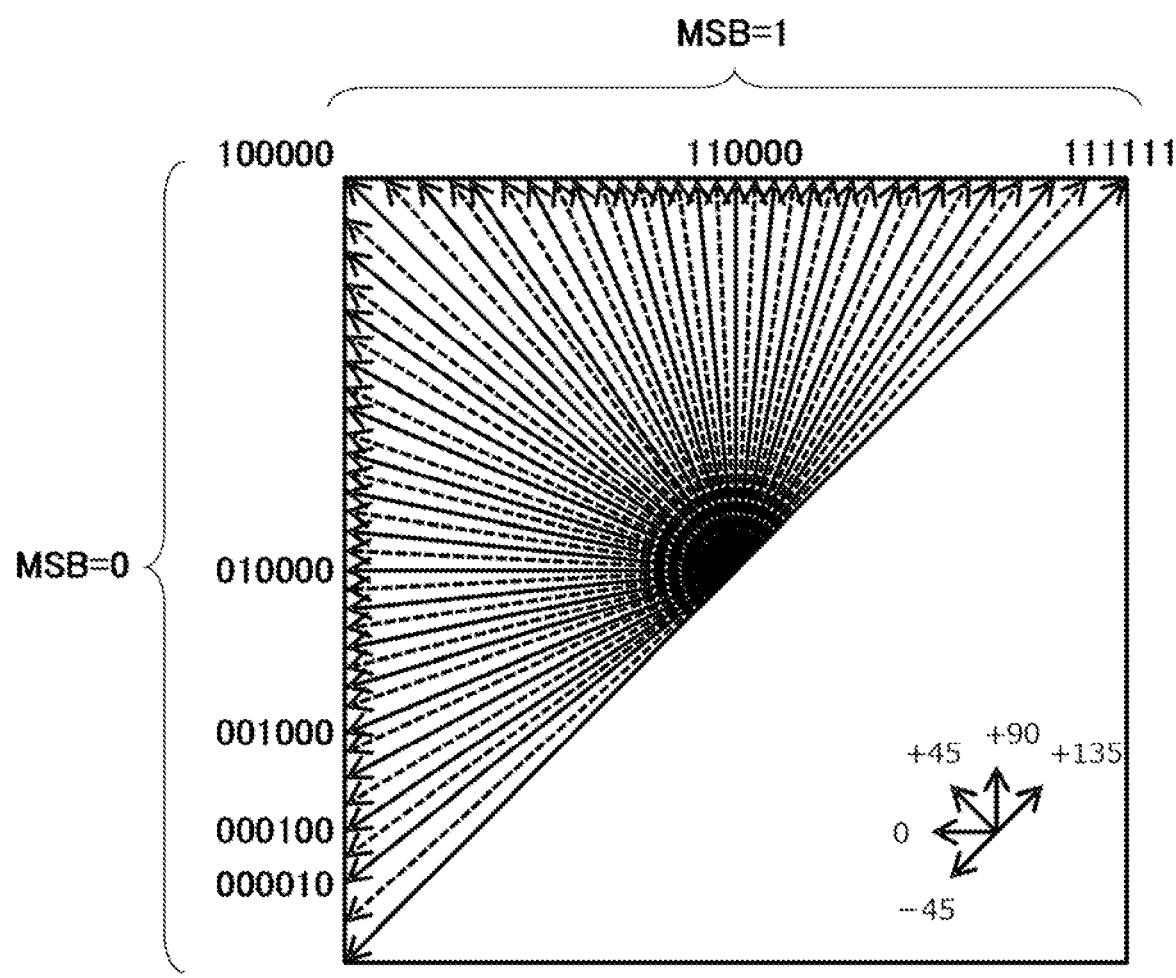
FIG. 12 is a first diagram illustrating a specific example of a binary signal generated by a binarization unit.

Next, details of processing by the binarization unit 1101 will be described. As described above, the binarization unit 1101 generates the binary signals of the syntax elements in the encoding target. FIG. 12 is a first diagram illustrating a specific example of a binary signal generated by the binarization unit, and illustrates the binary signal of IntraLumaMPMRemainder.

IntraLumaMPMRemainder is any of 64 numbers of 0 to 63, and roughly corresponds to one of 64 reference directions. Therefore, the binary signal of IntraLumaMPMRemainder may be represented as in FIG. 12.

For example, in the binary signal of IntraLumaMPMRemainder, the most significant bit (MSB)=0 means that the reference direction is the left neighboring block (horizontal direction). In the binary signal of IntraLumaMPMRemainder, the most significant bit (MSB)=1 means that the reference direction is the upper neighboring block (vertical direction).

<Details of Mode Predicted Value Generation Unit>

Next, details of processing by the mode predicted value generation unit 1104 will be described. As described above, the mode predicted value generation unit 1104 calculates the predicted value of the most significant bit (MSB predicted value) on which the context-based binary arithmetic encoding method is to be performed among the bits in the binary signal of IntraLumaMPMRemainder.

Figure 13:
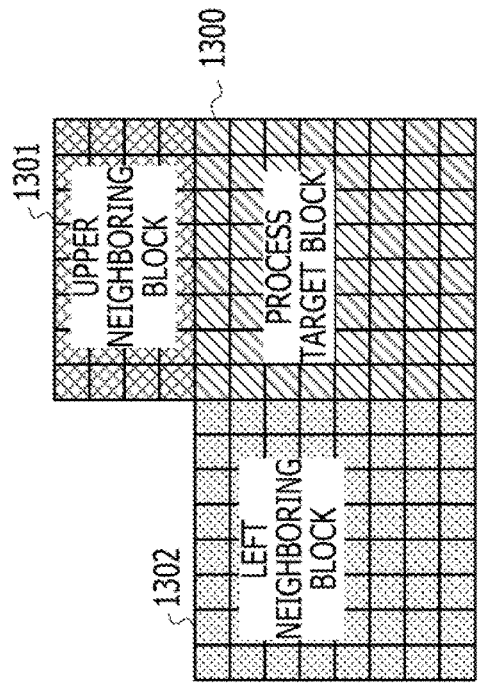
FIG. 13 is a diagram for explaining a method of calculating an MSB predicted value.

FIG. 13 is a diagram for explaining a method of calculating an MSB predicted value. For calculating the MSB predicted value, the mode predicted value generation unit 1104 uses the intra prediction mode for an upper neighboring block 1301 adjacent on the upper side of a process target block 1300 and the intra prediction mode for a left neighboring block 1302 adjacent on the left side of the process target block 1300.

If the first intra prediction mode number of the neighboring block is less than 2, the mode predicted value generation unit 1104 determines that the intra prediction for the neighboring block is in the DC prediction mode or the planar prediction mode.

On the other hand, if the first intra prediction mode number of the neighboring block is in a range of 2 to 34, the mode predicted value generation unit 1104 determines that the intra prediction for the neighboring block is in the angular prediction mode and the reference direction is the horizontal direction. If the first intra prediction mode number of the neighboring block is in a range of 35 to 66, the mode predicted value generation unit 1104 determines that the intra prediction for the neighboring block is in the angular prediction mode and the reference direction is the vertical direction.

The mode predicted value generation unit 1104 calculates the MSB predicted value in the binary signal of IntraLumaMPMRemainder for the process target block based on the intra prediction mode of the neighboring block (see a list 1310 in FIG. 13).

Context model 1

In a case where both first intra prediction mode numbers of the upper neighboring block and the left neighboring block are the number indicating "the DC prediction mode or the planar prediction mode", the mode predicted value generation unit 1104 calculates the MSB predicted value as "0".

Context model 2

In a case where any one of the first intra prediction mode numbers of the upper neighboring block and the left neighboring block is not the number indicating "the DC prediction mode or the planar prediction mode", the mode predicted value generation unit 1104
- calculates the MSB predicted value as "0" if any one of the numbers is a number indicating the angular prediction mode and specifying the reference direction as "the horizontal direction".
- calculates the MSB predicted value as "1" if any one of the numbers is a number indicating the angular prediction mode and specifying the reference direction as "the vertical direction".

Context model 3

In a case where the first intra prediction mode numbers of the upper neighboring block and the left neighboring block are numbers indicating the angular prediction mode, and both specifying the reference directions as "the horizontal direction", the mode predicted value generation unit 1104 calculates the MSB predicted value as "0". In a case where the first intra prediction mode numbers of the upper neighboring block and the left neighboring block are numbers indicating the angular prediction mode, and both specifying the reference directions as "the vertical direction", the mode predicted value generation unit 1104 calculates the MSB predicted value as "1".

Context model 4

In a case where the first intra prediction mode numbers of the upper neighboring block and the left neighboring block are numbers indicating the angular prediction mode, and specifying any one of the reference directions as "the horizontal direction" and the other reference direction as "the vertical direction", the mode predicted value generation unit 1104 calculates the MSB predicted value as "0".

<Functional Configuration of Decoding Apparatus>

Next, a functional configuration of the decoding apparatus 120 will be described. A decoding program is installed in the decoding apparatus 120. By executing the program, the decoding apparatus 120 decodes an encoded stream received from the encoding apparatus 110 via a network (not illustrated), and outputs video data.

Figure 14:
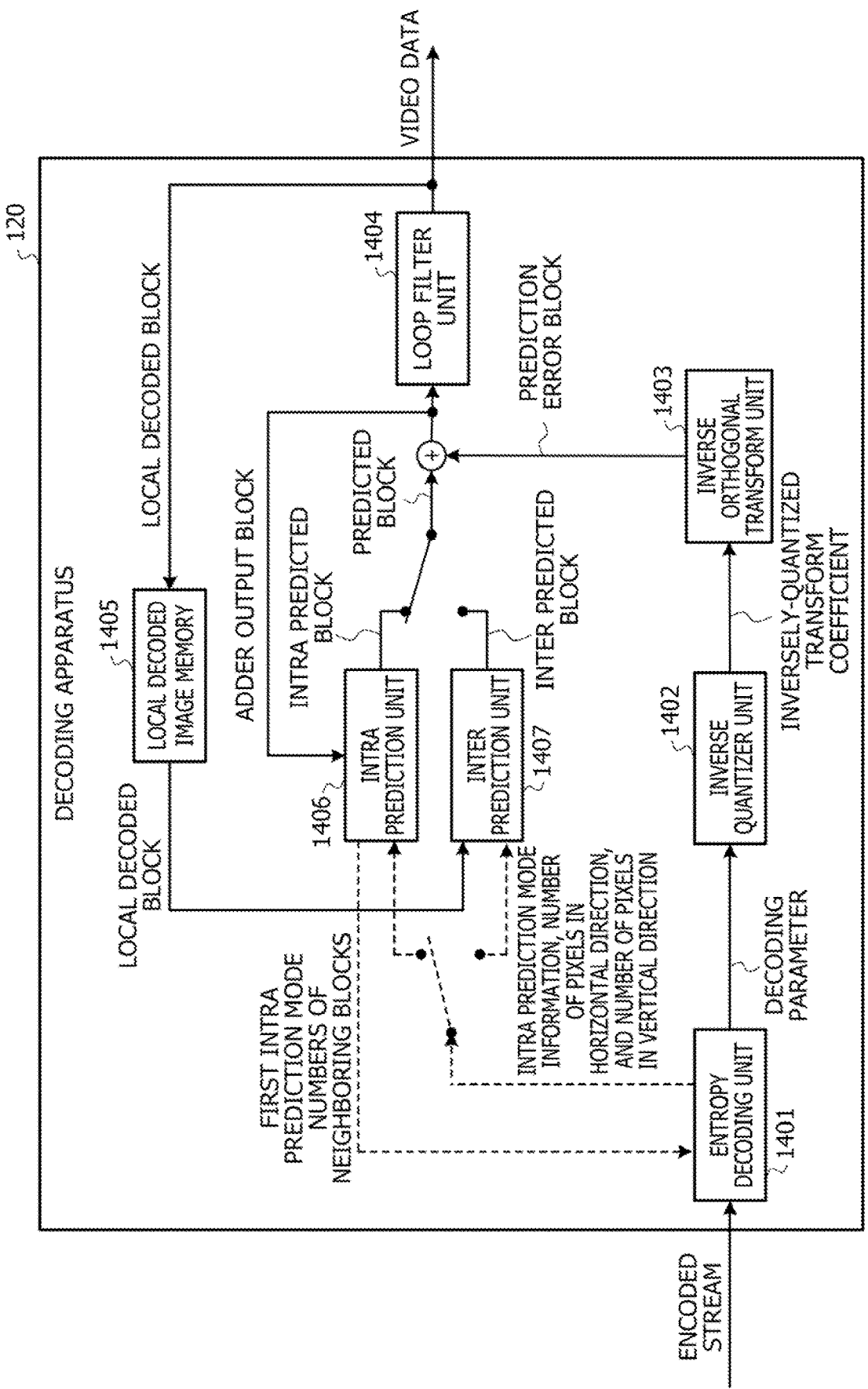
FIG. 14 is a diagram illustrating an example of a functional configuration of a decoding apparatus.

FIG. 14 is a diagram illustrating an example of the functional configuration of the decoding apparatus. As illustrated in FIG. 14, the decoding apparatus 120 includes an entropy decoding unit 1401, an inverse quantizer unit 1402, an inverse orthogonal transform unit 1403, a loop filter unit 1404, and a local decoded image memory 1405. The decoding apparatus 120 also includes an intra prediction unit 1406 and an inter prediction unit 1407.

The entropy decoding unit 1401 is an example of a decoding unit, decodes an encoded stream, and notifies the inverse quantizer unit 1402 of a decoding parameter of a process target block.

The entropy decoding unit 1401 decodes the encoded stream to obtain the intra prediction mode information, the number of pixels in the horizontal direction, and the number of pixels in the vertical direction of the process target block, and notifies the intra prediction unit 1406 of the obtained information. For obtaining the intra prediction mode information, the entropy decoding unit 1401 uses the first intra prediction mode number of the neighboring block notified of by the intra prediction unit 1406.

The inverse quantizer unit 1402 performs inverse quantization on the decoding parameter notified of by the entropy decoding unit 1401 to calculate an inverse quantization coefficient. The inverse quantizer unit 1402 notifies the inverse orthogonal transform unit 1403 of the calculated inverse quantization coefficient.

The inverse orthogonal transform unit 1403 performs inverse orthogonal transform on the inverse quantization coefficient notified of by the inverse quantizer unit 1402 to generate a prediction error block. A predicted block generated by the prediction unit (the intra prediction unit 1406 or the inter prediction unit 1407) to be described later is added to the prediction error block generated by the inverse orthogonal transform unit 1403 to generate an adder output block.

The loop filter unit 1404 performs filtering processing on the generated adder output block by using a deblocking filter or the like, and outputs the local decoded blocks after the filtering processing in units of frames, thereby outputting the video data.

The loop filter unit 1404 stores the local decoded block after the filtering processing in the local decoded image memory 1405.

The intra prediction unit 1406 is an example of a prediction unit, and performs intra prediction to generate an intra predicted block. For example, the intra prediction unit 1406 obtains the intra prediction mode information, the number of pixels in the horizontal direction, and the number of pixels in the vertical direction from the entropy decoding unit 1401. The intra prediction unit 1406 generates an intra predicted block by referring to the upper or left neighboring block of the process target block among the adder output blocks, based on the obtained intra prediction mode information, the obtained number of pixels in the horizontal direction, and the obtained number of pixels in the vertical direction. The intra prediction unit 1406 notifies the entropy decoding unit 1401 of the first intra prediction mode number calculated when generating the intra predicted block as the first intra prediction mode number of a neighboring block to be used to decode a next process target block.

The inter prediction unit 1407 performs inter prediction on the process target block by using a local decoded block in another frame and thereby generates an inter predicted block.

In the decoding apparatus 120, one of the intra prediction unit 1406 and the inter prediction unit 1407 runs based on the information obtained by decoding the encoded stream, but a case where the intra prediction unit 1406 runs will be described below.

<Functional Configuration of Entropy Decoding Unit>

Figure 15:
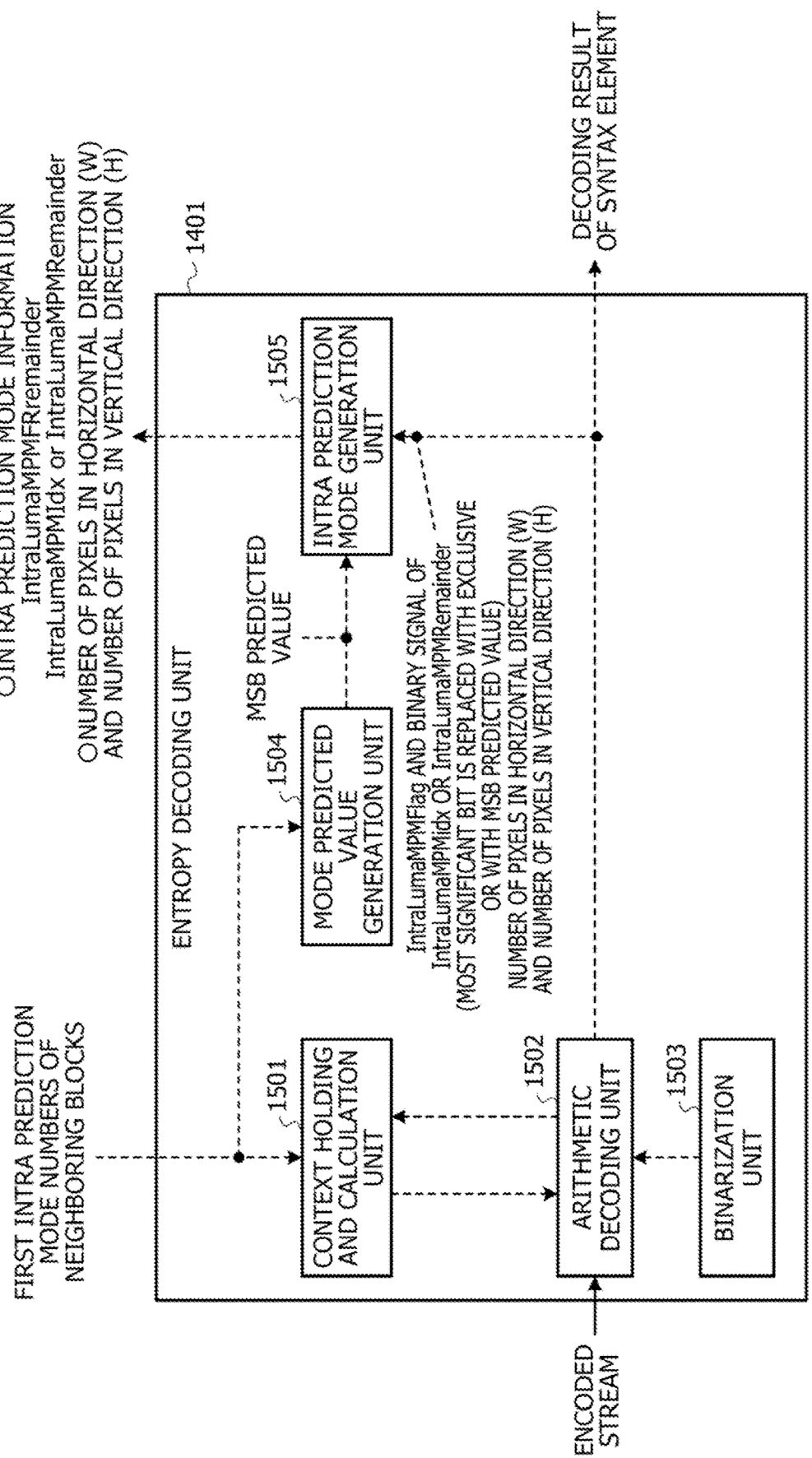
FIG. 15 is a diagram illustrating an example of a functional configuration of an entropy decoding unit of the decoding apparatus.

Next, a functional configuration of the entropy decoding unit 1401 will be described. FIG. 15 is a diagram illustrating an example of the functional configuration of the entropy decoding unit of the decoding apparatus. As illustrated in FIG. 15, the entropy decoding unit 1401 includes a context holding and calculation unit 1501, an arithmetic decoding unit 1502, a binarization unit 1503, a mode predicted value generation unit 1504, and an intra prediction mode generation unit 1505. The following description will be given of decoding of syntax elements in the encoded stream.

The arithmetic decoding unit 1502 obtains the binary signals of decoding target syntax elements output from the binarization unit 1503. The arithmetic decoding unit 1502 obtains context values (an MPS and a probability of occurrence thereof) for each of the bits in the binary signals of the decoding target syntax elements output from the context holding and calculation unit 1501. The arithmetic decoding unit 1502 arithmetically decodes the decoding target syntax elements in the encoded stream by using the context values (the MPS and the probability of occurrence) for each of the bits in the binary signals of the decoding target syntax elements obtained from the context holding and calculation unit 1501, and the binary signals of the decoding target syntax elements obtained from the binarization unit 1503.

The arithmetic decoding unit 1502 arithmetically decodes all the arithmetic decoding target syntax elements other than IntraLumaMPMRemainder based on the WC standard. The arithmetic decoding unit 1502 decodes, based on the WC standard, syntax elements to which the arithmetic decoding is not applied.

The arithmetic decoding unit 1502 notifies the units in the decoding apparatus 120 of the decoding results of the syntax elements, and notifies the context holding and calculation unit 1501 of the decoding results. Among the decoding results of the syntax elements reported to the units in the decoding apparatus 120, the arithmetic decoding unit 1502 notifies the intra prediction mode generation unit 1505 of IntraLumaMPMFlag, the binary signal of IntraLumaMPMIdx or IntraLumaMPMRemainder (in which the most significant bit is replaced with an exclusive OR with the MSB predicted value), and the number of pixels in the horizontal direction (W) and the number of pixels in the vertical direction (11).

The binarization unit 1503 outputs the binary signals of the decoding target syntax elements. Here, the binary signals of all the arithmetic decoding target syntax elements other than IntraLumaMPMRemainder are based on the WC standard.

The context holding and calculation unit 1501 outputs the context values (the MPS and the probability of occurrence thereof) for each of the bits in the binary signal of each decoding target syntax element. When notified of the decoding result for each bit in the binary signal of the decoding target syntax element by the arithmetic decoding unit 1502, the context holding and calculation unit 1501 updates the context values (the MPS and the probability of occurrence). The context holding and calculation unit 1501 stores the updated context values (the MPS and the probability of occurrence thereof) in order to derive the context values of a subsequent decoding target syntax element.

In the processing by the context holding and calculation unit 1501, the processing for all the arithmetic decoding target syntax elements other than IntraLumaMPMRemainder is performed based on the WC standard.

When notified of the first intra prediction mode number of the neighboring block by the intra prediction unit 1406, the context holding and calculation unit 1501 stores the first intra prediction mode number. The context holding and calculation unit 1501 generates and manages the context values (the MPS and the probability of occurrence thereof) for each of the bits in the binary signal of IntraLumaMPMRemainder as the decoding target based on the first intra prediction mode number.

The mode predicted value generation unit 1504 is an example of a calculation unit. When notified of the first intra prediction mode number of the neighboring block by the intra prediction unit 1406, the mode predicted value generation unit 1504 stores the first intra prediction mode number. The mode predicted value generation unit 1504 calculates an MSB predicted value in the binary signal of IntraLumaMPMRemainder for the process target block based on the first intra prediction mode number of the neighboring block, and notifies the intra prediction mode generation unit 1505 of the MSB predicted value. The processing by the mode predicted value generation unit 1504 is the same as the processing by the mode predicted value generation unit 1104 of the encoding apparatus 110.

The intra prediction mode generation unit 1505 is an example of a generation unit, and obtains information notified of by the arithmetic decoding unit 1502, including IntraLumaMPMFlag, the binary signal of IntraLumaMPMIdx or IntraLumaMPMRemainder (in which the most significant bit is replaced with an exclusive OR with the MSB predicted value), and the number of pixels in the horizontal direction (W) and the number of pixels in the vertical direction (H).

The intra prediction mode generation unit 1505 determines whether the obtained IntraLumaMPMFlag is "0" or "1". In the case of IntraLumaMPMFlag of "0", the intra prediction mode generation unit 1505 calculates an exclusive OR of the obtained binary signal of IntraLumaMPMRemainder and the MSB predicted value notified of by the mode predicted value generation unit 1504, and then calculates multi-valued IntraLumaMPMRemainder. Provided that the binary signal of IntraLumaMPMRemainder is (b0, b1, b2, b3, b4, b5), the intra prediction mode generation unit 1505 calculates the multi-valued IntraLumaMPMRemainder in accordance with the following equation:

$$\text{IntraLumaMPMRemainder}=((b0^{\wedge}P)<<5)+(b1<<4)+(b2<<3)+(b3<<2)+(b4<<1)+b5$$

where P is an MSB predicted value.

In this way, the intra prediction mode generation unit 1505 obtains the multi-valued IntraLumaMPMRemainder.

If the obtained IntraLumaMPMFlag is "1", the intra prediction mode generation unit 1505 obtains IntraLumaMPMIdx.

The intra prediction mode generation unit 1505 notifies the intra prediction unit 1406 of the intra prediction mode information including the obtained IntraLumaMPMFlag, and the obtained IntraLumaMPMIdx or IntraLumaMPMRemainder and together notifies the intra prediction unit 1406 of the obtained number of pixels in the horizontal direction (W) and the obtained number of pixels in the vertical direction (H).

<Functional Configuration of Intra Prediction Unit>

Figure 16:
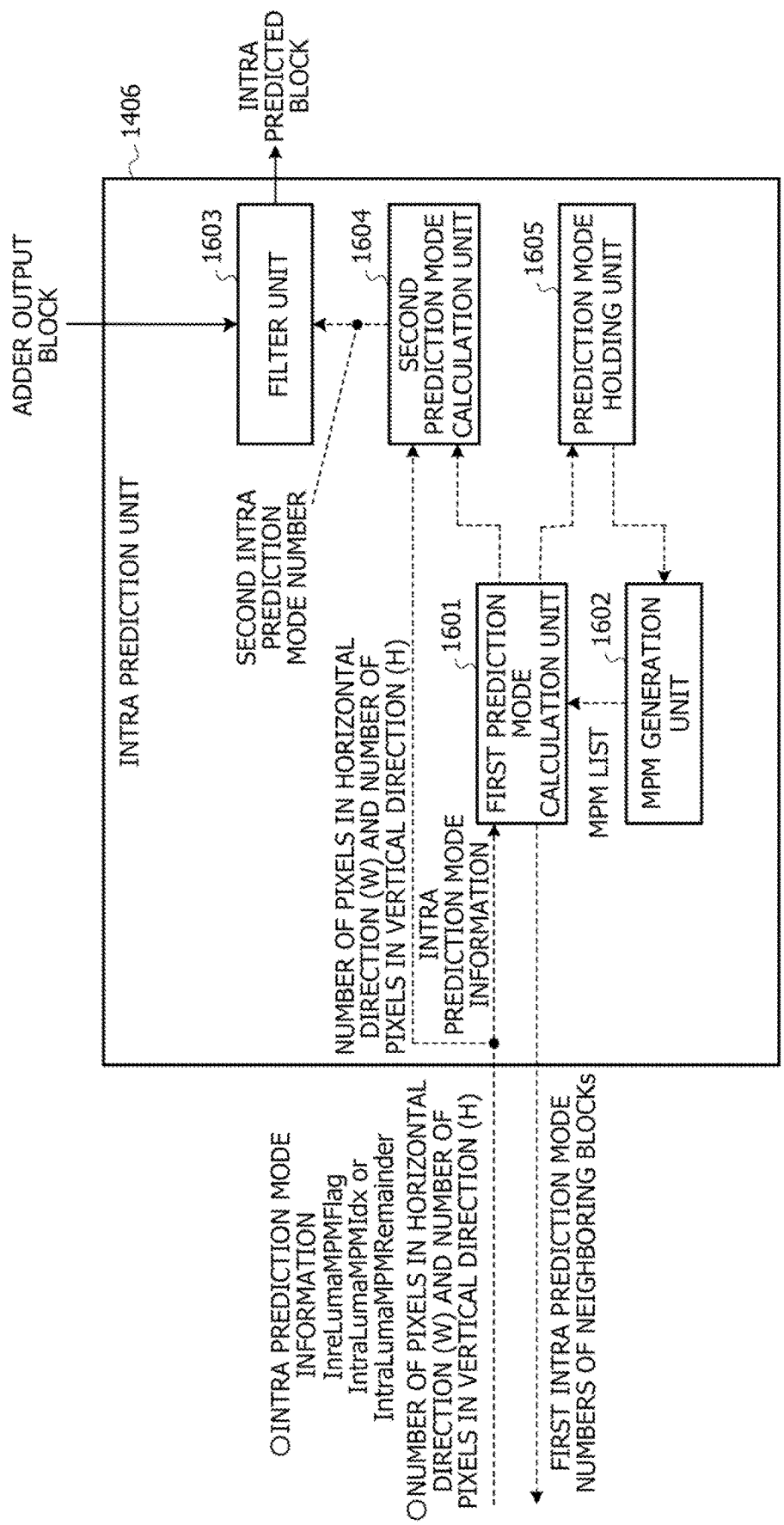
FIG. 16 is a diagram illustrating an example of a functional configuration of an intra prediction unit of the decoding apparatus.

Next, a functional configuration of the intra prediction unit 1406 will be described. FIG. 16 is a diagram illustrating an example of the functional configuration of the intra prediction unit of the decoding apparatus. As illustrated in FIG. 16, the intra prediction unit 1406 includes a first prediction mode calculation unit 1601, an MPM generation unit 1602, a filter unit 1603, a second prediction mode calculation unit 1604, and a prediction mode holding unit 1605.

When notified of the first intra prediction mode number of the neighboring block from the prediction mode holding unit 1605, the MPM generation unit 1602 generates the MPM list of the process target block. The MPM generation unit 1602 notifies the first prediction mode calculation unit 1601 of the generated MPM list. The MPM list is generated based on the VVC standard.

The prediction mode holding unit 1605 holds the first intra prediction mode number of each block in a process target frame. In a case where the process target block is subjected to inter prediction, the number indicating the DC prediction mode is held as the first intra prediction mode number of the process target block. The prediction mode holding unit 1605 notifies the MPM generation unit 1602 of the held first intra prediction mode number of the neighboring block.

The first prediction mode calculation unit 1601 extracts IntraLumaMPMFlag from the intra prediction mode information of the process target block notified of by the entropy decoding unit 1401.

If the extracted IntraLumaMPMFlag is "1", the first prediction mode calculation unit 1601 obtains IntraLumaMPMIdx from the intra prediction mode information of the process target block. The first prediction mode calculation unit 1601 notifies the second prediction mode calculation unit 1604 and the prediction mode holding unit 1605 of the first intra prediction mode number specified by IntraLumaMPMIdx in the MPM list.

If the extracted IntraLumaMPMFlag is "0", the first prediction mode calculation unit 1601 obtains IntraLumaMPMRemainder from the intra prediction mode information of the process target block. The first prediction mode calculation unit 1601 performs correction processing on the obtained IntraLumaMPMRemainder (by adding at most 3), and generates the first intra prediction mode number. The correction processing is performed based on the WC standard.

The first prediction mode calculation unit 1601 notifies the second prediction mode calculation unit 1604 and the prediction mode holding unit 1605 of the generated first intra prediction mode number.

The second prediction mode calculation unit 1604 converts the first intra prediction mode number into the second intra prediction mode number based on the number of pixels in the horizontal direction (W) and the number of pixels in the vertical direction (H) of the process target block, which are notified of by the entropy decoding unit 1401. The conversion processing is performed based on the WC standard.

The filter unit 1603 applies a filter according to the second intra prediction mode number output from the second prediction mode calculation unit 1604 to the pixel values of the adder output block, and calculates the predicted pixel values of the process target block. The filter unit 1603 outputs the calculated predicted pixel values as an intra predicted block. The filtering processing is performed based on the WC standard.

<Sequence of Decoding and Intra Prediction Processing by Entropy Decoding Unit and Intra Prediction Unit>

Figure 17:
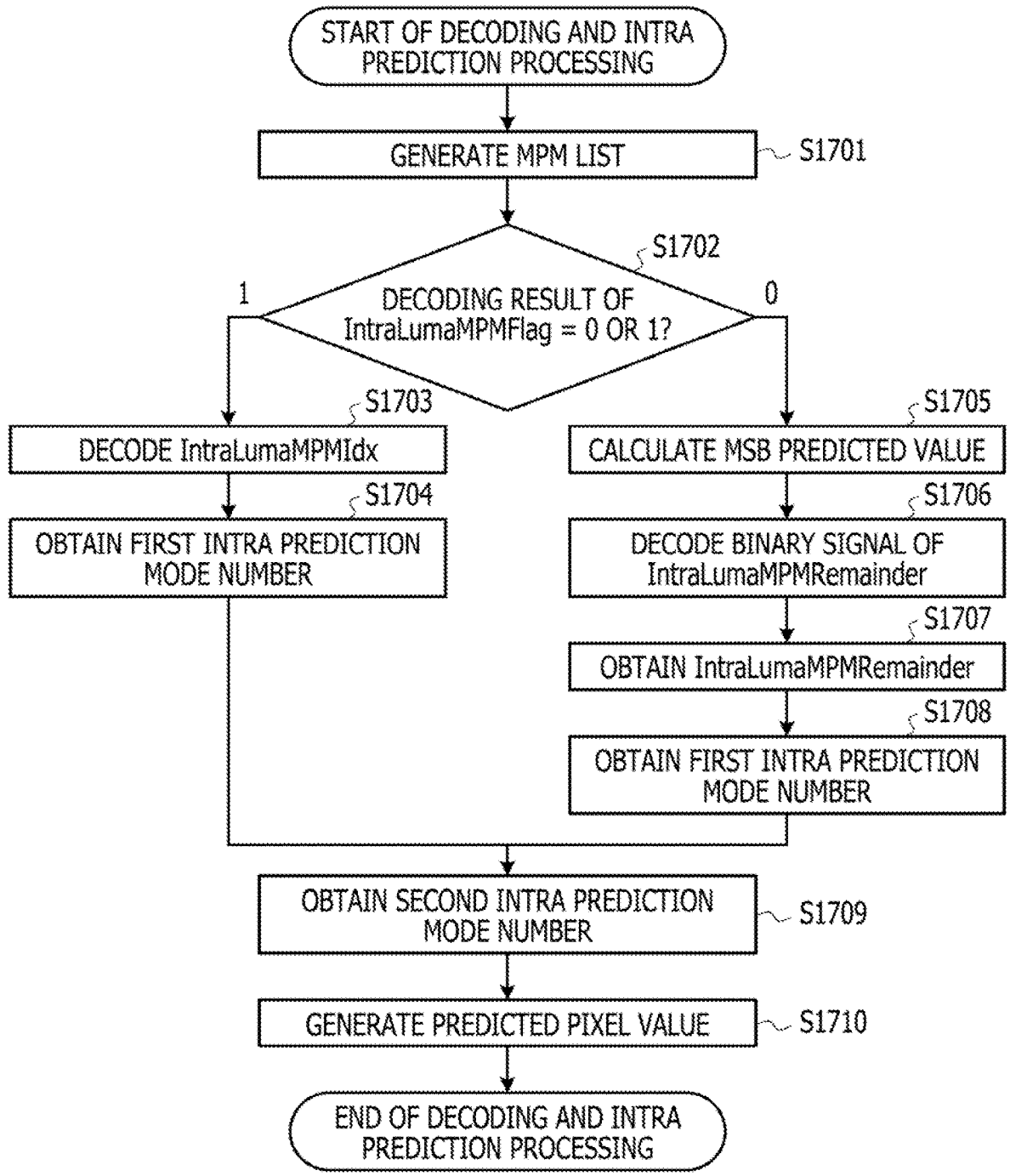
FIG. 17 is a flowchart illustrating a sequence of decoding and intra prediction processing by the entropy decoding unit and the intra prediction unit.

Next, a sequence of decoding and intra prediction processing by the entropy decoding unit 1401 and the intra prediction unit 1406 will be described. FIG. 17 is a flowchart illustrating a sequence of decoding and intra prediction processing by the entropy decoding unit and the intra prediction unit.

In step S1701, the MPM generation unit 1602 generates the MPM list from the first intra prediction mode numbers of the left neighboring block and the upper neighboring block, which are held in the prediction mode holding unit 1605.

In step S1702, the arithmetic decoding unit 1502 decodes the encoded stream to obtain IntraLumaMPMFlag. If the decoded IntraLumaMPMFlag is "1", the arithmetic decoding unit 1502 proceeds to step S1703.

In step S1703, the arithmetic decoding unit 1502 decodes the encoded stream to obtain IntraLumaMPMIdx.

In step S1704, the first prediction mode calculation unit 1601 obtains the first intra prediction mode number specified by IntraLumaMPMIdx in the MPM list.

On the other hand, if the decoded IntraLumaMPMFlag is "0" in step S1702, the entropy decoding unit 1401 proceeds to step S1705.

In step S1705, the mode predicted value generation unit 1504 calculates the MSB predicted value in IntraLumaMPMRemainder for the process target block from the first intra prediction mode numbers of the left neighboring block and the upper neighboring block.

In step S1706, the arithmetic decoding unit 1502 decodes the encoded stream to obtain the binary signal of IntraLumaMPMRemainder. The arithmetic decoding unit 1502 obtains the binary signal of IntraLumaMPMRemainder by performing decoding involving context-adaptive binary arithmetic decoding on the MSB and binary arithmetic decoding in the bypass mode on the least significant bits (LSB).

In step S1707, the intra prediction mode generation unit 1505 calculates an exclusive OR of the MSB in the decoded binary signal of IntraLumaMPMRemainder and the MSB predicted value. As a result, the intra prediction mode generation unit 1505 obtains IntraLumaMPMRemainder for the process target block.

In step S1708, the first prediction mode calculation unit 1601 corrects IntraLumaMPMRemainder to obtain the first intra prediction mode number.

In step S1709, the second prediction mode calculation unit 1604 converts the first intra prediction mode number into the second intra prediction mode number by using the number of pixels in the horizontal direction and the number of pixels in the vertical direction of the process target block.

In step S1709, the filter unit 1603 performs filtering of the reference pixel and generation of the predicted pixel value by referring the reference direction corresponding to the second intra prediction mode number.

As is clear from the above description, the encoding apparatus according to the first embodiment arithmetically encodes the binary signal of the intra prediction mode number, which is converted into 6 bits based on the WC standard, after calculating an exclusive OR with the MSB predicted value. The encoding apparatus according to the first embodiment calculates the MSB predicted value based on the intra prediction mode numbers of the neighboring blocks.

Thus, in the encoding on the binary signal of the 6 bit-converted intra prediction mode number, the encoding apparatus according to the first embodiment achieves an increase in the probability of executing the arithmetic encoding on the most significant bit in the context mode. As a result, the encoding apparatus according to the first embodiment makes it possible to reduce the code amount in the encoded binary signal of the 6 bit-converted intra prediction mode number. For example, the encoding apparatus according to the first embodiment may reduce the code amount in the intra prediction.

The decoding apparatus according to the first embodiment calculates the intra prediction mode number based on the decoding result of the encoded stream by using the MSB predicted value calculated based on the intra prediction mode numbers of the neighboring blocks.

Thus, the decoding apparatus according to the first embodiment makes it possible to decode the encoded stream with the code amount reduced and generate the intra prediction mode information.

Second Embodiment

The first embodiment has been described in which the predicted value is calculated for the most significant bit (one most significant bit) among the bits in the binary signal of IntraLumaMPMRemainder. In contrast, in a second embodiment, predicted values are calculated for two most significant bits. Hereinafter, the second embodiment will be described by focusing on differences from the above-described first embodiment.

<Details of Processing by Binarization Unit>

Figure 18:
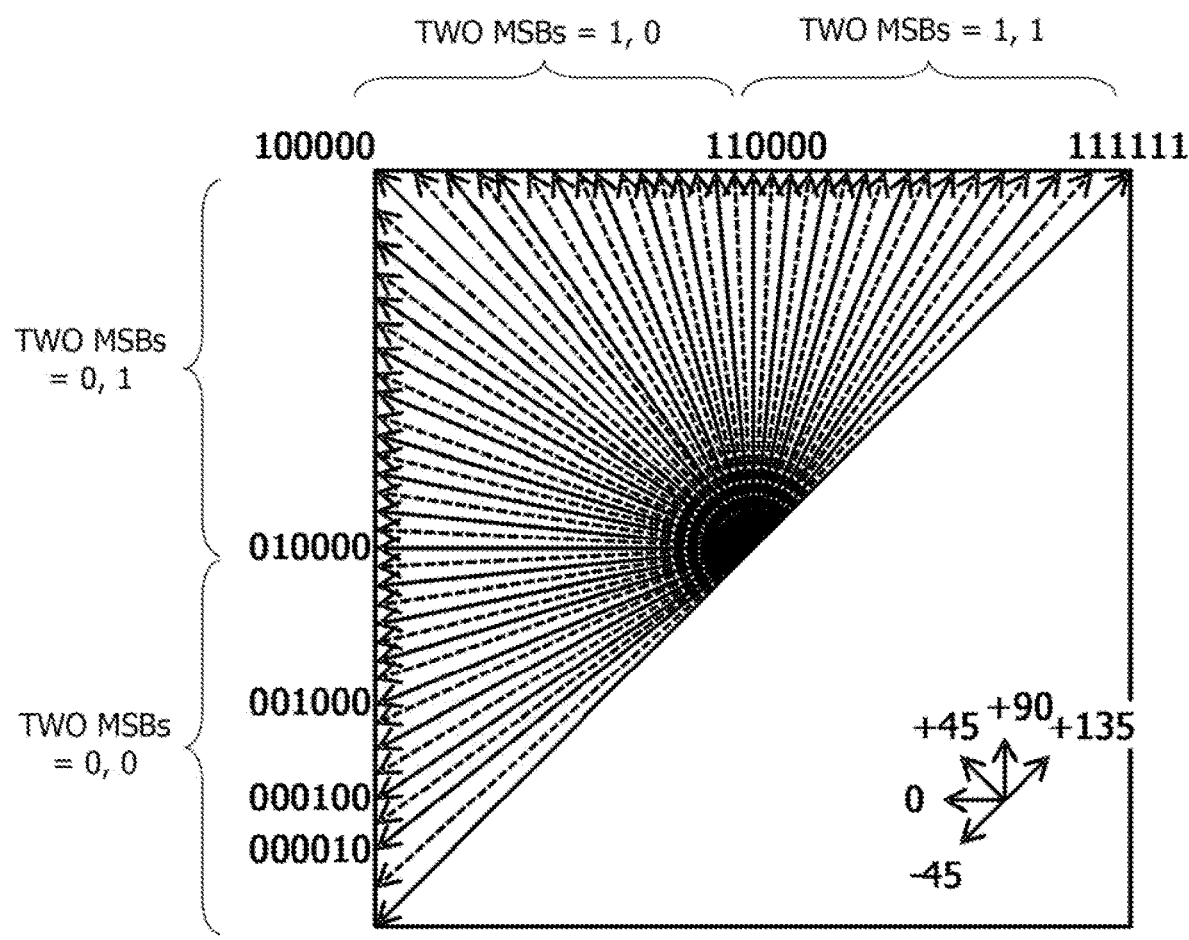
FIG. 18 is a second diagram illustrating a specific example of the binary signal generated by the binarization unit.

First, details of processing by the binarization unit 1101 according to the second embodiment will be described below. FIG. 18 is a second diagram illustrating a specific example of a binary signal generated by the binarization unit, and illustrates a binary signal of IntraLumaMPMRemainder.

As described above, IntraLumaMPMRemainder is any one of 64 numbers of 0 to 63, and roughly corresponds to one of the 64 reference directions. Therefore, a binary signal of IntraLumaMPMRemainder (b0, b1, b2, b3, b4, b5) may be represented as in FIG. 18.

For example, in the binary signal of IntraLumaMPMRemainder, the two most significant bits (b0, b1)=(0, 0) mean that the reference direction is the left lower neighboring block (horizontal lower direction).

In the binary signal of IntraLumaMPMRemainder, the two most significant bits (b0, b1)=(0, 1) mean that the reference direction is the left upper neighboring block (horizontal upper direction).

In the binary signal of IntraLumaMPMRemainder, the two most significant bits (b0, b1)=(1, 0) mean that the reference direction is the upper left neighboring block (vertical left direction).

In the binary signal of IntraLumaMPMRemainder, the two most significant bits (b0, b1)=(1, 1) mean that the reference direction is the upper right neighboring block (vertical right direction).

<Details of Processing by Mode Predicted Value Generation Unit>

Next, details of processing by the mode predicted value generation unit 1104 according to the second embodiment will be described. In the second embodiment, the mode predicted value generation unit 1104 calculates predicted values of the two most significant bits on which the context-based binary arithmetic encoding method is to be performed among the bits in the binary signal of IntraLumaMPMRemainder. For example, in the second embodiment, the mode predicted value generation unit 1104 classifies the first intra prediction mode number of the neighboring block as follows:

the first intra prediction mode number is less than 2: the DC prediction or the planar prediction;
the first intra prediction mode number is 2 to 18: the horizontal lower direction;
the first intra prediction mode number is 19 to 34: the horizontal upper direction;
the first intra prediction mode number is 35 to 50: the vertical left direction; and
the first intra prediction mode number is 51 to 66: the vertical right direction.

Figure 19:
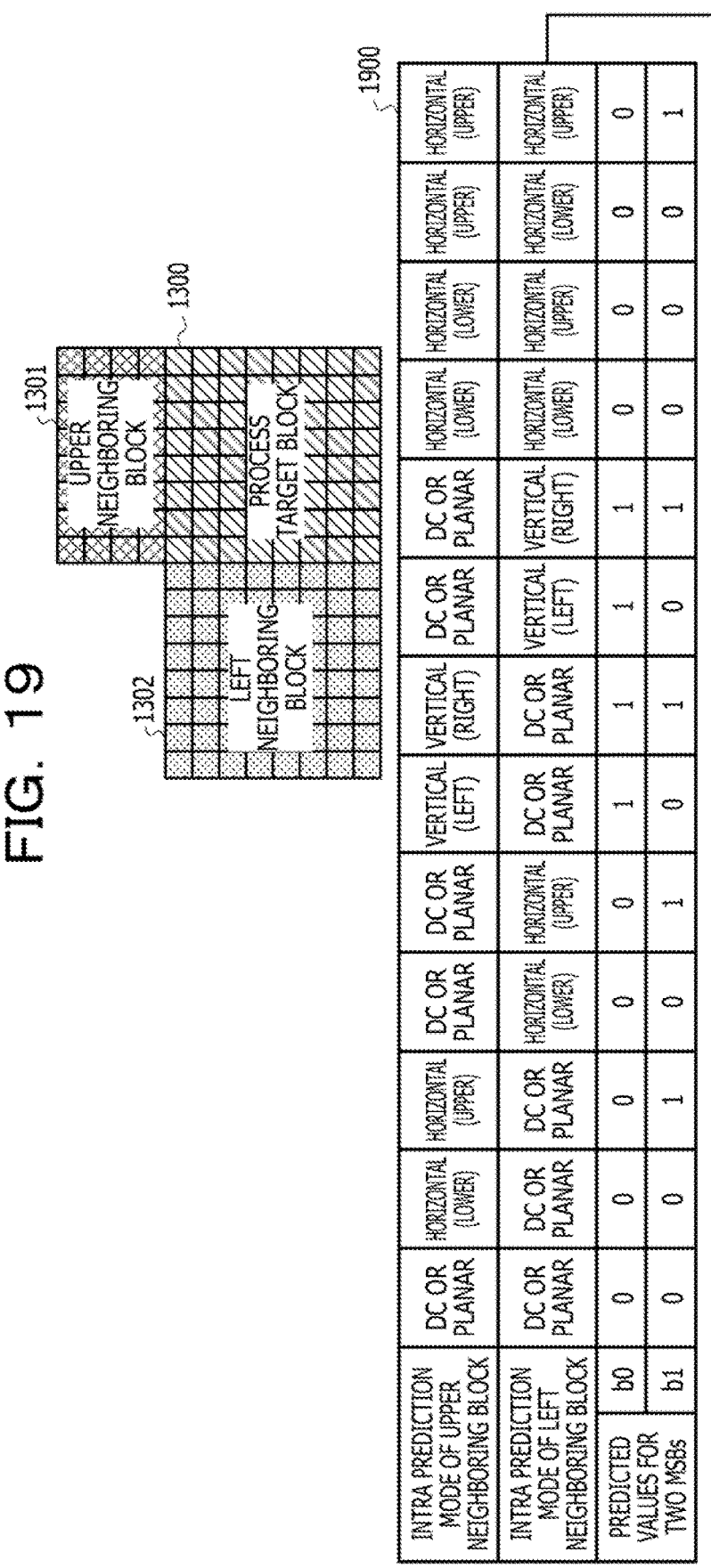
FIG. 19 is a diagram for explaining a method of calculating predicted values for the two most significant bits.

In the second embodiment, the mode predicted value generation unit 1104 calculates the predicted values for the two most significant bits (b0, b1) based on the first intra prediction mode numbers of the neighboring blocks. FIG. 19 is a diagram for explaining a method of calculating the predicted values for the two most significant bits. As illustrated in a list 1900 in FIG. 19, in the second embodiment, the mode predicted value generation unit 1104 calculates the predicted values for the two most significant bits (b0, b1) as follows.

Context Model 1

In a case where both first intra prediction mode numbers of the upper neighboring block and the left neighboring block are the number indicating "the DC prediction mode or the planar prediction mode", the mode predicted value generation unit 1104 calculates the predicted values for the two most significant bits as b0=0 and b1=0.

Context Model 2

In a case where any one of the first intra prediction mode numbers of the upper neighboring block and the left neighboring block is the number indicating "the DC prediction mode or the planar prediction mode", and in a case where the other is a number indicating the angular prediction mode and specifying the reference direction as "the horizontal lower direction", the mode predicted value generation unit 1104 calculates b0=0 and b1=0;

in a case where the other is a number indicating the angular prediction mode and specifying the reference direction as "the horizontal upper direction", the mode predicted value generation unit 1104 calculates b0=0 and b1=1;

in a case where the other is a number indicating the angular prediction mode and specifying the reference direction as "the vertical left direction", the mode predicted value generation unit 1104 calculates b0=1 and b1=0; and in a case where the other is a number indicating the angular prediction mode and specifying the reference direction as "the vertical right direction", the mode predicted value generation unit 1104 calculates b0=1 and b1=1.

Context Model 3

In a case where none of the first intra prediction mode numbers of the upper neighboring block and the left neighboring block is the number indicating "the DC prediction mode or the planar prediction mode", but both are numbers indicating the angular prediction mode and each indicating "the horizontal lower direction" or "the horizontal upper direction", and in a case where both are numbers indicating the "the horizontal upper direction", the mode predicted value generation unit 1104 calculates b0=0 and b1=1; and in a case where at least one of the numbers is a number indicating "the horizontal lower direction", the mode predicted value generation unit 1104 calculates b0=0 and b1=0.

In a case where none of the first intra prediction mode numbers of the upper neighboring block and the left neighboring block is the number indicating "the DC prediction mode or the planar prediction mode", but both are numbers indicating the angular prediction mode and each indicating "the vertical left direction" or "the vertical right direction", and in a case where both are numbers indicating the "the vertical right direction", the mode predicted value generation unit 1104 calculates b0=1 and b1=1; and in a case where at least one of the numbers is a number indicating "the vertical left direction", the mode predicted value generation unit 1104 calculates b0=1 and b1=0.

Context Model 4

In a case where any one of the first intra prediction mode numbers of the upper neighboring block and the left neighboring block is a number indicating "the angular prediction mode" and indicating "the horizontal lower direction" or "the horizontal upper direction", and in a case where the other is a number indicating "the vertical left direction" or "the vertical right direction", the mode predicted value generation unit 1104 calculates b0=0 and b1=0.

<Processing by Intra Prediction Mode Generation Unit>

Next, details of processing by the intra prediction mode generation unit 1505 according to the second embodiment will be described. In the second embodiment, the intra prediction mode generation unit 1505 converts the binary signal of IntraLumaMPMRemainder (b0, b1, b2, b3, b4, b5) into a multi-valued signal in accordance with following equation:

$$\text{IntraLumaMPMRemainder} = ((b0\char`^P0) <<5) + ((b1\char`^P1)<<4) + (b2<<3) + (b3<<2) + (b4<<1) + b5$$

where P0 and P1 are predicted values for the two most significant bits.

As is clear from the above description, the encoding apparatus according to the second embodiment arithmetically encodes a binary signal of the intra prediction mode number, which is converted into 6 bits based on the WC standard, after calculating exclusive ORs with the predicted values for the two most significant bits. The encoding apparatus according to the second embodiment calculates the predicted values for the two most significant bits based on the intra prediction mode numbers of the neighboring blocks.

Thus, in the encoding on the binary signal of the 6 bit-converted intra prediction mode number, the encoding apparatus according to the second embodiment achieves an increase in the probability of executing the arithmetic encoding on the two most significant bits in the context mode. As a result, the encoding apparatus according to the second embodiment makes it possible to reduce the code amount in the encoded binary signal of the 6 bit-converted intra prediction mode number. For example, the encoding apparatus according to the second embodiment may reduce the code amount in the intra prediction.

The decoding apparatus according to the second embodiment calculates the intra prediction mode number based on the decoding result of the encoded stream by using the predicted values for the two most significant bits calculated based on the intra prediction mode numbers of the neighboring blocks.

Thus, the decoding apparatus according to the second embodiment makes it possible to decode the encoded stream with the code amount reduced and generate the intra prediction mode information.

Other Embodiments

The first and second embodiments have been described in which the predicted value(s) are calculated for the most significant bit or the two most significant bits in the binary signal of IntraLumaMPMRemainder. However, the predicted value calculation target bits are not limited thereto, and predicted values may be calculated for m most significant bits (m is an integer of 1 or more). In this case, the arithmetic encoding unit 1102 performs the arithmetic encoding in the context mode on the m most significant bits in IntraLumaMPMRemainder and performs the arithmetic encoding in the bypass mode on the values of the bits other than the m most significant bits in IntraLumaMPMRemainder.

Although the encoding apparatus and the decoding apparatus are described as separate apparatuses in the first and second embodiments, the encoding apparatus and the decoding apparatus may be integrated in a single apparatus.

The present disclosure is not limited to the configurations illustrated above, like a case where, for example, the configurations exemplified according to the aforementioned embodiments may also be combined with other elements. These aspects may be changed without departing from the gist of the present disclosure and appropriately determined in accordance with application modes thereof.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An encoding apparatus comprising:
   a memory; and
   a processor coupled to the memory and configured to:
      generate a value corresponding to a reference direction selected in intra prediction for a process target block by converting a value indicating the reference direction in accordance with a shape of the process target block;

calculate a predicted value in the process target block from the values corresponding to the reference directions generated in intra prediction for neighboring blocks adjacent to the process target block; and generate a binary signal for arithmetic encoding based on the predicted value and the value corresponding to the reference direction generated in the intra prediction for the process target block, the binary signal for arithmetic encoding is generated by calculating an exclusive OR of each of values of m most significant bits (m is an integer of 1 or more) of the binary signal generated based on the value corresponding to the reference direction and the predicted value.

2. The encoding apparatus according to claim 1, wherein the processor calculates the predicted value in the process target block from the values corresponding to the reference directions generated in intra prediction for an upper neighboring block adjacent on an upper side of the process target block and a left neighboring block adjacent on a left side of the process target block.

3. The encoding apparatus according to claim 1, wherein the processor calculates the predicted value by determining whether each of the values corresponding to the reference directions generated in the intra prediction for the neighboring blocks adjacent to the process target block is a value indicating a horizontal direction or a value indicating a vertical direction.

4. The encoding apparatus according to claim 1, wherein the processor arithmetically encodes the values of the m most significant bits in the binary signal for arithmetic encoding in a context mode, the m most significant bits used to calculate the exclusive OR with the predicted value.

5. The encoding apparatus according to claim 4, wherein the processor arithmetically encodes the values of the bits other than the m most significant bits in the binary signal for arithmetic encoding in a bypass mode.

6. The encoding apparatus according to claim 1, wherein in a case where the reference direction selected in the intra prediction for the process target block allows intra prediction even when reversed by 180.degree. and where a distance to a reference pixel in the selected reference direction is longer than a distance to a reference pixel in the reference direction reversed by 180.degree., the processor sets a value indicating the reference direction reversed by 180.degree. as the value corresponding to the reference direction generated by the conversion in accordance with the shape of the process target block.

7. An encoding method causing a computer to execute a process comprising:

generating a value corresponding to a reference direction selected in intra prediction for a process target block by converting a value indicating the reference direction in accordance with a shape of the process target block;

calculating a predicted value in the process target block from the values corresponding to the reference directions generated in intra prediction for neighboring blocks adjacent to the process target block; and generating a binary signal for arithmetic encoding based on the predicted value and the value corresponding to the reference direction generated in the intra prediction for the process target block, the binary signal for arithmetic encoding is generated by calculating an exclusive OR of each of values of m most significant bits (m is an integer of 1 or more) of the binary signal generated based on the value corresponding to the reference direction and the predicted value.

8. A decoding apparatus comprising:

a memory; and a processor coupled to the memory and configured to:

decode an encoded stream to generate intra prediction mode information of a process target block;

calculate a value indicating a reference direction from the intra prediction mode information by converting the intra prediction mode information in accordance with a shape of the process target block, and perform intra prediction for the process target block;

calculate a predicted value in the process target block based on the intra prediction mode information to perform the intra prediction for neighboring blocks adjacent to the process target block; and generate the intra prediction mode information by using the predicted value, the intra prediction mode information is generated by calculating an exclusive OR of each of the values of m most significant bits in a binary signal obtained by decoding the encoded stream and the predicted value.

9. The decoding apparatus according to claim 8, wherein the processor calculates the predicted value in the process target block based on the intra prediction mode information used to perform intra prediction for an upper neighboring block adjacent on an upper side of the process target block and a left neighboring block adjacent on a left side of the process target block.

10. The decoding apparatus according to claim 8, wherein the processor calculates the predicted value by determining whether each of the values corresponding to the reference directions calculated from the intra prediction mode information to perform intra prediction for neighboring blocks adjacent to the process target block is a value indicating a horizontal direction or a value indicating a vertical direction.

* * * * *